(12) United States Patent
Fitzpatrick et al.

(10) Patent No.: US 12,197,945 B2
(45) Date of Patent: Jan. 14, 2025

(54) QUANTUM COMPUTER PERFORMANCE ENHANCEMENT

(71) Applicant: International Business Machines Corporation, Armonk, NY (US)

(72) Inventors: Mattias Fitzpatrick, Mount Kisco, NY (US); Haggai Landa, Tel Aviv (IL); Naoki Kanazawa, Yokohama (JP); James John Raftery, Ridgefield, CT (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 454 days.

(21) Appl. No.: 17/657,706

(22) Filed: Apr. 1, 2022

(65) Prior Publication Data
US 2023/0315516 A1    Oct. 5, 2023

(51) Int. Cl.
*G06F 9/48*    (2006.01)
*G06N 10/40*   (2022.01)

(52) U.S. Cl.
CPC ........... *G06F 9/4881* (2013.01); *G06N 10/40* (2022.01)

(58) Field of Classification Search
None
See application file for complete search history.

(56) References Cited

U.S. PATENT DOCUMENTS 9,940,212 B2   4/2018 Kelly
10,282,675 B2  5/2019 Bloom et al.
(Continued)

FOREIGN PATENT DOCUMENTS

CN   113011594 A    6/2021
EP   4 020 333 A1   6/2022
(Continued)

OTHER PUBLICATIONS

Kelly et al., Physical Qubit Calibration on a Directed Acyclic Graph, https://arxiv.org/abs/1803.03226, dated Mar. 8, 2018, 7 pages.
(Continued)

*Primary Examiner* — Umut Onat
(74) *Attorney, Agent, or Firm* — Amin, Turocy & Watson, LLP

(57) ABSTRACT

Techniques for enhanced calibration and performance of quantum computers are presented. A monitoring job component can execute monitoring jobs on a quantum computer. A modeler component can determine respective quantum computer system state parameter values at a given time based on parameter values at respective time instances, the parameter values determined from output data generated by the quantum computer in response to execution of the monitoring jobs. A calibration agent can determine a calibration strategy relating to ordering of performance of calibration tasks to calibrate at least one parameter associated with the quantum computer based on the quantum computer system state parameter values. Calibration agent can determine a reward relating to benefits and costs associated with performing calibrations of quantum computers, and, based on the reward, can update a calibration policy that can be used to determine or update the calibration strategy for calibrating parameters associated with quantum computers.

17 Claims, 17 Drawing Sheets

(56) References Cited

U.S. PATENT DOCUMENTS

| | | | |
|---|---|---|---|
| 2019/0007051 A1* | 1/2019 | Sete | G06N 10/00 |
| 2020/0394524 A1 | 12/2020 | Vainsencher et al. | |
| 2021/0067176 A1* | 3/2021 | Leipold | G06F 15/16 |
| 2021/0304054 A1 | 9/2021 | Neill et al. | |
| 2022/0156622 A1* | 5/2022 | Putterman | G06N 10/40 |
| 2022/0156630 A1* | 5/2022 | Schuster | H10N 69/00 |

FOREIGN PATENT DOCUMENTS

| | | |
|---|---|---|
| WO | 2019/117922 A1 | 6/2019 |
| WO | 2019/152020 A1 | 8/2019 |

OTHER PUBLICATIONS

Evans et al., DeepMind AI Reduces Google Data Centre Cooling Bill by 40%, Blog Post Reserach, Jul. 20, 2016, 6 pages.

Scholten, Towards Scalable Characterization of Noisy, Intermediate-Scale Quantum Information Processors, Dissertation, University of New Mexico, 2018, 323 pages.

Disclosed Anonymously, A Method for Low-Latency Closed-Loop Pulse Calibration, IPCOM000265304D, IP.com, Mar. 23, 2021, 5 pages.

Bautista et al., Towards Automated Superconducting Circuit Calibration using Deep Reinforcement Learning, 2021 IEEE Computer Society Annual Symposium on VLSI (ISVLSI), IEEE, 2021, 6 pages.

Statistical Process Control, https://en.wikipedia.org/wiki/Statistical_process_control, last accessed Apr. 1, 2022, 6 pages.

Nelson Rules, https://en.wikipedia.org/wiki/Nelson_rules, last accessed Mar. 22, 2022, 4 pages.

Dehling et al., Chapter 2 Principles of Stochastic Process Modeling, Mathematics in Science and Engineering, vol. 211, pp. 29-63, 2007, 35 pages.

Bhatt, 5 Things You Need to Know about Reinforcement Learning, https://www.kdnuggets.com/2018/03/5-things-reinforcement-learning.html, Youplus on Mar. 28, 2018, 6 pages.

Mell et al., "The NIST Definition of Cloud Computing," Recommendations of the National Institute of Standards and Technology, NIST Special Publication 800-145, Sep. 2011, 7 pages.

International Search Report and Written Opinion received for PCT Application Serial No. PCT/EP2023/057770 dated Jun. 30, 2023, 18 pages.

Sivak et al., "Model-Free Quantum Control with Reinforcement Learning", arXiv:2104.14539v2, Dec. 6, 2021, 27 pages.

Tornow et al., "Minimum Quantum Run-Time Characterization and Calibration via Restless Measurements with Dynamic Repetition Rates", URL:https://arxiv.org/pdf/2202.06981v1.pdf, Jun. 15, 2022, 17 pages.

Carvalho et al., "Error-Robust Quantum Logic Optimization using a Cloud Quantum Computer Interface", arXiv:2010.08057v1, Oct. 15, 2020, 22 pages.

* cited by examiner

QUANTUM COMPUTER PERFORMANCE ENHANCEMENT

BACKGROUND

The subject disclosure relates to quantum computing using quantum circuits. Quantum computing employs quantum physics to encode and process information. In contrast to classical computation which uses binary bits of information, quantum computation can utilize quantum bits (also referred to as qubits) that operate according to the laws of quantum physics and can exhibit quantum mechanical phenomena such as superposition and entanglement. The superposition principle of quantum physics can allow qubits to be in a state that partially represent both a value of "1" and a value of "0" at the same time. The entanglement principle of quantum physics can allow qubits to be correlated with each other such that the combined states of the qubits cannot be factored individual qubit states. For instance, a state of a first qubit can depend on a state of a second qubit. As such, a quantum circuit can employ qubits to encode and process information in a manner that can be significantly different from binary digital techniques based on transistors.

There can be challenges in quantum computing though. For instance, isolating quantum computing systems from the environment can be one challenge. Also, qubits, in use, typically can be manipulated, and the manipulation of qubits often can subject the quantum computing system to noise sources and decoherence. Quantum computing system parameters, such as, for example, the temperature of electronics of the system, can undesirably change as well. As a result, it can be desirable to calibrate quantum computers to maintain their performance. However, existing calibration approaches can be undesirably time intensive and resource intensive.

The above-described description is merely intended to provide a contextual overview regarding quantum computer systems, and is not intended to be exhaustive.

SUMMARY

The following presents a summary to provide a basic understanding of one or more embodiments of the disclosed subject matter. This summary is not intended to identify key or critical elements, or delineate any scope of the particular embodiments or any scope of the claims. Its sole purpose is to present concepts in a simplified form as a prelude to the more detailed description that is presented later. In one or more embodiments described herein, systems, devices, structures, computer-implemented methods, apparatuses, and/or computer program products that can desirably calibrate quantum computers are provided.

An embodiment relates to a system comprising a memory that stores computer-executable components; and a processor, operatively coupled to the memory, that executes computer-executable components. The computer-executable components can comprise a monitoring job component that can execute a group of monitoring jobs on a quantum computer based on a group of data that is input to the quantum computer. The computer-executable components also can include a calibration agent that can determine a calibration strategy relating to an ordering of performance of a group of calibration tasks to calibrate at least one parameter associated with the quantum computer based on input from the group of monitoring jobs. Such embodiments of the system can provide a number of advantages, including that the system can enhance performance of the quantum computer while reducing unavailability of the quantum computer due to performance of calibrations on the quantum computer.

In some embodiments, the system also can comprise: a modeler component that can determine respective quantum computer system state parameter values associated with the quantum computer at a given time instance based on the group of parameter values determined from output data generated by the quantum computer in response to the execution of the group of monitoring jobs, wherein a group of quantum computer system state parameter values can model respective states of the quantum computer associated with the respective parameters, and wherein the group of quantum computer system state parameter values can comprise the respective quantum computer system state parameter values. In certain embodiments, the system further can comprise that the calibration agent can determine the calibration strategy for the calibration of the quantum computer, which can comprise determining a group of items to calibrate, determining respective orderings of performance of calibration tasks to calibrate respective items of the group of items, or determining scheduling of the calibration of the group of items associated with the quantum computer, based on the group of quantum computer system state parameter values, wherein the group of items can comprise a qubit or a pair of qubits of the quantum computer or a portion of the respective parameters associated with the quantum computer. In still other embodiments, the calibration agent, using an artificial intelligence model, can perform an analysis on at least one of parameter values associated with the quantum computer or quantum computer system state parameter values associated with the quantum computer that are input to the artificial intelligence model, wherein, based on a result of the analysis, the calibration agent can determine the calibration strategy, the reward value, or an update to a calibration policy relating to calibration of a group of quantum computers, comprising the quantum computer, and wherein the calibration agent can be trained based on the reward value or the result of the analysis. These embodiments of the system can provide a number of advantages, including that the system can efficiently determine a desirable calibration strategy for calibrating the quantum computer and can enhance performance of the quantum computer while reducing unavailability of the quantum computer due to performance of calibrations on the quantum computer.

In some embodiments, elements described in connection with the disclosed methods can be embodied in different forms such as a method, a computer program product, or another form.

These and other features will become apparent from the following detailed description of illustrative embodiments thereof, which is to be read in connection with the accompanying drawings.

DETAILED DESCRIPTION

Figure 1:
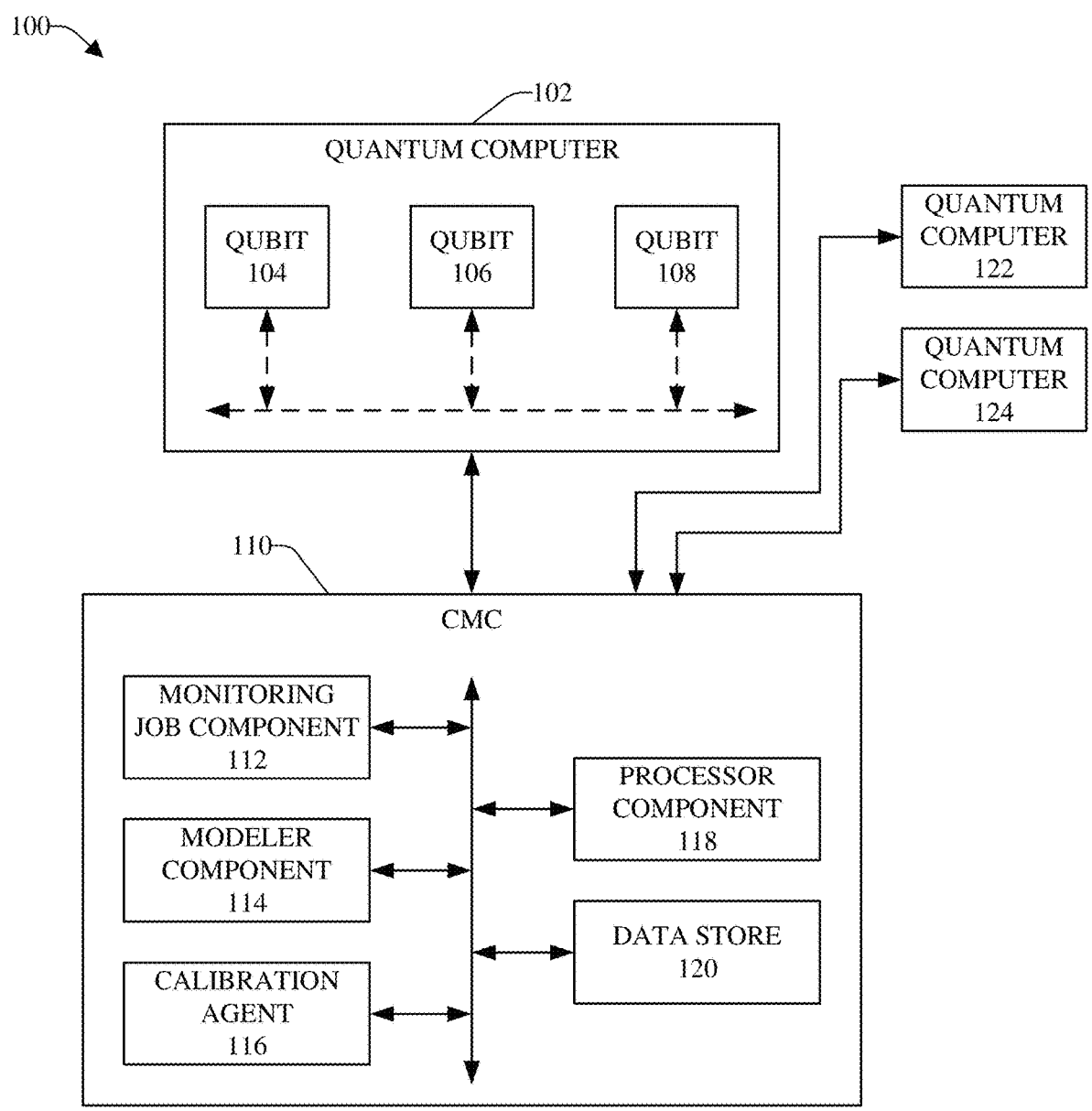
FIG. 1 illustrates a block diagram of an example, non-limiting system that can determine and execute a desirable calibration strategy for calibrating and enhancing performance of a quantum computer.

The following detailed description is merely illustrative and is not intended to limit embodiments and/or application or uses of embodiments. Furthermore, there is no intention to be bound by any expressed or implied information presented in the preceding Background or Summary sections, or in the Detailed Description section.

One or more embodiments are now described with reference to the drawings, wherein like referenced numerals are used to refer to like elements throughout. In the following description, for purposes of explanation, numerous specific details are set forth in order to provide a more thorough understanding of the one or more embodiments. It is evident, however, in various cases, that the one or more embodiments can be practiced without these specific details.

Quantum computers can leverage the laws of quantum mechanics to manipulate information. In contrast to classical computation which uses binary bits of information, quantum computation can utilize qubits that can operate according to the laws of quantum physics and can exhibit quantum mechanical phenomena such as superposition and entanglement, which can be used to perform computations that can be difficult for even the largest classical supercomputers to perform.

There can be challenges in quantum computing though. For instance, isolating quantum computing systems from the environment can be one challenge. Also, qubits, in use, typically can be manipulated, and the manipulation of qubits often can subject the quantum computing system to noise sources and decoherence. Quantum computing system parameters, such as, for example, the temperature of electronics of the system, can undesirably change as well. As a result, it can be desirable to calibrate quantum computers to maintain their performance. However, existing calibration approaches can be undesirably time intensive and resource intensive. Further, existing calibration approaches are not sufficiently scalable and a significant amount of time can be spent on calibration of a quantum computer when calibration is not warranted at the time.

Some existing approaches for calibrating a quantum computer typically can involve only using a particular type of calibration routine to calibrate a qubit or qubit gate of a quantum computer. Although these existing approaches potentially might be usable to calibrate a qubit or qubit gate at a given time instance, such existing approaches can be undesirably inefficient or ineffective in comprehensively calibrating various system parameters associated with qubits, qubit gates, or other quantum components or circuitry of a quantum computer, and overall performance of the quantum computer, over time.

It can be desirable to be able to comprehensively calibrate (e.g., automatically or dynamically calibrate) and enhance the performance of system parameters associated with qubits, qubit gates, or other quantum components or circuitry of a quantum computer, and overall performance of the quantum computer, over time. It also can be desirable to reduce unnecessary calibration of quantum computers to thereby reduce unavailability of quantum computers due to undergoing calibration. The disclosed subject matter can be implemented to produce a solution to all or at least some of these problems and/or other problems with existing approaches for calibrating quantum computers.

To that end, the various aspects and embodiments herein relate to techniques for enhanced calibration and performance of quantum computers are presented. A monitoring job component can execute monitoring jobs on a quantum computer. A set (e.g., group) of system parameter values of system parameters associated with the quantum computer can be determined, estimated, or measured based on the execution of the monitoring jobs. A modeler component can determine respective system state parameter values of system parameters associated with the quantum computer at a given time based on the set of system parameter values at respective time instances (e.g., time steps). A calibration agent can determine a calibration strategy relating to ordering of performance of a group of calibration jobs (e.g., tasks) to calibrate at least one parameter associated with the quantum computer, based on the system state parameter values, to enhance (e.g., improve, increase, or optimize) performance of the quantum computer. The calibration agent can perform calibrations of system parameters associated with the quantum computer and/or other quantum computers based on (e.g., in accordance with) the calibration strategy. The calibration agent also can determine a reward relating to benefits and costs associated with performing calibrations of the quantum computer, and, based on the reward, can update a calibration policy that can be used to determine or update the calibration strategy for calibrating system parameters associated with the quantum computer (e.g., during a subsequent iteration of calibration of the quantum computer). The updating of the policy also can be part of the training of the calibration agent, such as described herein.

The techniques for enhanced calibration and performance of quantum computers of the disclosed subject matter, such as described herein, can have a number of desirable advantages. For example, such techniques can enhance (e.g., improve, increase, or optimize) performance of the qubits or other quantum components or circuitry, and overall performance of quantum computers, can reduce unwarranted or unnecessary calibrations associated with quantum computers, reduce unavailability of quantum computers due to calibration being performed on them, and reduce the amount of resources (e.g., time resources, computing resources, financial resources or other resources) utilized to calibrate quantum computers.

These and other aspects and embodiments of the disclosed subject matter will now be described with respect to the drawings.

FIG. 1 illustrates a block diagram of an example, non-limiting system 100 that can determine and execute a desirable calibration strategy for calibrating (e.g., automatically or dynamically calibrating) and enhancing performance of a quantum computer, in accordance with various aspects and embodiments of the disclosed subject matter. The system 100 can comprise a quantum computer 102 that can include various quantum devices, quantum circuitry, and/or other components. The quantum devices can comprise, for example, a set of qubits, including qubit 104, qubit 106, and qubit 108. The quantum computer 102 can be programmed and desired quantum circuits, comprising qubits and other quantum devices, circuitry, and components, can be formed, for example, based on, a set of instructions (e.g., assembled sequence of instructions) that can be input to and run (e.g., executed) on the quantum computer 102 to create and operate desired quantum circuits, wherein the structure of the quantum circuits, and operations (e.g., quantum operations) performed by the quantum circuits, can be based on the set of instructions. In response to execution of a quantum program, comprising or associated with the set of instructions and/or comprising input data or parameter data, and operation of the quantum circuits based on such quantum program, the quantum computer 102 can produce results (e.g., data results), which also can be referred to as readout results or readout determinations. The quantum computer 102 can present (e.g., communicate or transmit) the results as an output.

In some embodiments, the qubits (e.g., 104, 106, 108) can be transmon qubits (e.g., superconducting transmon qubits) or other type of charge qubit. In other embodiments, the qubits (e.g., 104, 106, 108) can be formed using a different type of quantum-mechanical technology. Each of the qubits (e.g., 104, 106, 108) can perform a universal set of single and two-qubit gates, which can be characterized by a set of system parameters $\lambda_i$ (e.g., a set of quantum computer system parameters), wherein i can be virtually any desired number. The system parameters $\lambda_i$ can describe or relate to a particular quantum computer, such as quantum computer 102, wherein the system parameters can comprise, for example, qubit frequency $f_{01}$ (e.g., a transition frequency of a qubit from the ground state to the first excited state) or other type of frequency associated with a qubit, multi-qubit (e.g., two-qubit) gates, higher order qubit gates, thermal relaxation time $T_1$, dephasing time $T_2$, low frequency noise, temperature of the quantum computer 102 (e.g., temperature of certain quantum components of the quantum computer 102), Xp amplitude (e.g., amplitude of Xp pulse), cross-resonance (CR) amplitudes and angles, readout error, or other desired system parameters associated with the quantum computer 102.

As disclosed herein, there can be various deficiencies with existing approaches for calibrating quantum computers. Such deficiencies can result in inefficient (e.g., unnecessary or unwarranted; or excessive) calibration of quantum computers, undesirable (e.g., wasteful or inefficient; suboptimal) use of resources (e.g., time resources, computing resources, or other resources), undesirable costs (e.g., time costs, resource costs, or financial costs) associated with the inefficient calibration of quantum computers, and undesirable unavailability of quantum computers due to the quantum computers undergoing undesirable calibrations.

To overcome these and other problems with existing approaches for calibrating quantum computers, in accordance with various embodiments, the system 100 can comprise a calibration management component (CMC) 110 that can be associated with the quantum computer 102 and/or other quantum computers, and can determine and execute a desirable (e.g., suitable, enhanced, or optimal) calibration strategy (e.g., a parameter enhancement strategy) for calibrating (e.g., automatically or dynamically calibrating) and enhancing performance of the quantum computer 102 and/or the other quantum computers, in accordance with defined calibration management criteria. The calibration strategy can enhance (e.g., improve, increase, or optimize) overall performance of the quantum computer 102 (e.g., enhance performance of qubits, including qubit gates, and/or a readout instruction set associated with the quantum computer 102, while also enhancing (e.g., improving, increasing, or maximizing) the availability of the quantum computer 102 by reducing downtime or unavailability of the quantum computer 102 for performance of calibration jobs on the quantum computer 102). To facilitate desirable calibration of the quantum computer 102 and/or other quantum computers, the CMC 110 can comprise a monitoring job component 112, a modeler component 114, and calibration agent 116.

The monitoring job component 112 can run (e.g., execute or perform) a monitoring job set, M, on the quantum computer 102 to infer or determine system parameters associated with the quantum computer 102 (e.g., associated with the qubits (e.g., 104, 106, 108) of the quantum computer 102). The monitoring job component 112 can run a monitoring job, $M_i$, to infer, estimate, or determine a system parameter, $\lambda_i$, associated with the quantum computer 102, wherein i can be virtually any desired number. A monitoring job set, M, can be a set of $N_A$ monitoring jobs, wherein $M \equiv [M_0, M_1, M_2, \ldots, M_{N_A}]$, and wherein N can be virtually any desired number. The monitoring jobs (e.g., monitoring tasks) of the monitoring job set can comprise monitoring experiments, such as, for example, error amplification sequences, randomized benchmarking, or other desired designated monitoring sequences. The monitoring jobs can be utilized to facilitate identifying or exposing one or more system parameters associated with the quantum computer 102 that have changed significantly or have an error (e.g., error in a value, or an average or median error in values, of or associated with a system parameter) associated therewith. For instance, the monitoring job set can be utilized to facilitate identifying a system parameter that has a parameter value(s) that has undergone at least a threshold amount of change in the parameter value(s) from a desired (e.g., target, suitable, or optimal) parameter value(s). As an example, with regard to a particular system parameter (e.g., a system parameter, such as described herein), an error amplification sequence (or other desired monitoring experiment) can be designed such that, if the particular system parameter is suboptimal (e.g., has a parameter value that is outside of a desired (e.g., target, suitable, or optimal) threshold range of parameter values), the running of the error amplification sequence (or other desired monitoring experiment) can produce a result (e.g., a system parameter value) that can indicate the particular system parameter is suboptimal. If the particular system parameter is in a desirable state, the running of the error amplification sequence (or other desired monitoring experiment) can produce a result that can indicate the particular system parameter is in the desirable state (e.g., is within the desired threshold range of parameter values). The monitoring job set can be applied with regard to microwave pulses, laser pulses, or other types of pulses, depending on the type of quantum technology being employed by the quantum computer 102.

In certain embodiments, the set of monitoring jobs can be designed or determined by a user, wherein the set of monitoring jobs can be an initial, default, or static set or a subsequently determined (e.g., subsequently adapted or modified) set of monitoring jobs. The CMC 110 can receive input data from the user, and the monitoring job component 112 can create the set of monitoring jobs based on the input data. In other embodiments, the calibration agent 116 can design or determine a set (e.g., an adapted set) of monitoring jobs that can be utilized (e.g., executed) by the monitoring job component 112 during a given running of monitoring jobs. For instance, based on the training of the calibration agent 116 (e.g., in a standard training loop or external training loop), such as described herein, the calibration agent 116 can adapt and enhance the design of the monitoring jobs and the timing of running of a set of monitoring jobs, in accordance with the calibration strategy, which can be determined by the calibration agent 116, as more fully described herein. In some embodiments, the monitoring job component 112 can input monitoring job data (e.g., monitoring jobs instructions) to the quantum computer 102 to facilitate forming quantum circuits, comprising the qubits (e.g., 104, 106, 108), and running the set of monitoring jobs.

Figure 2:
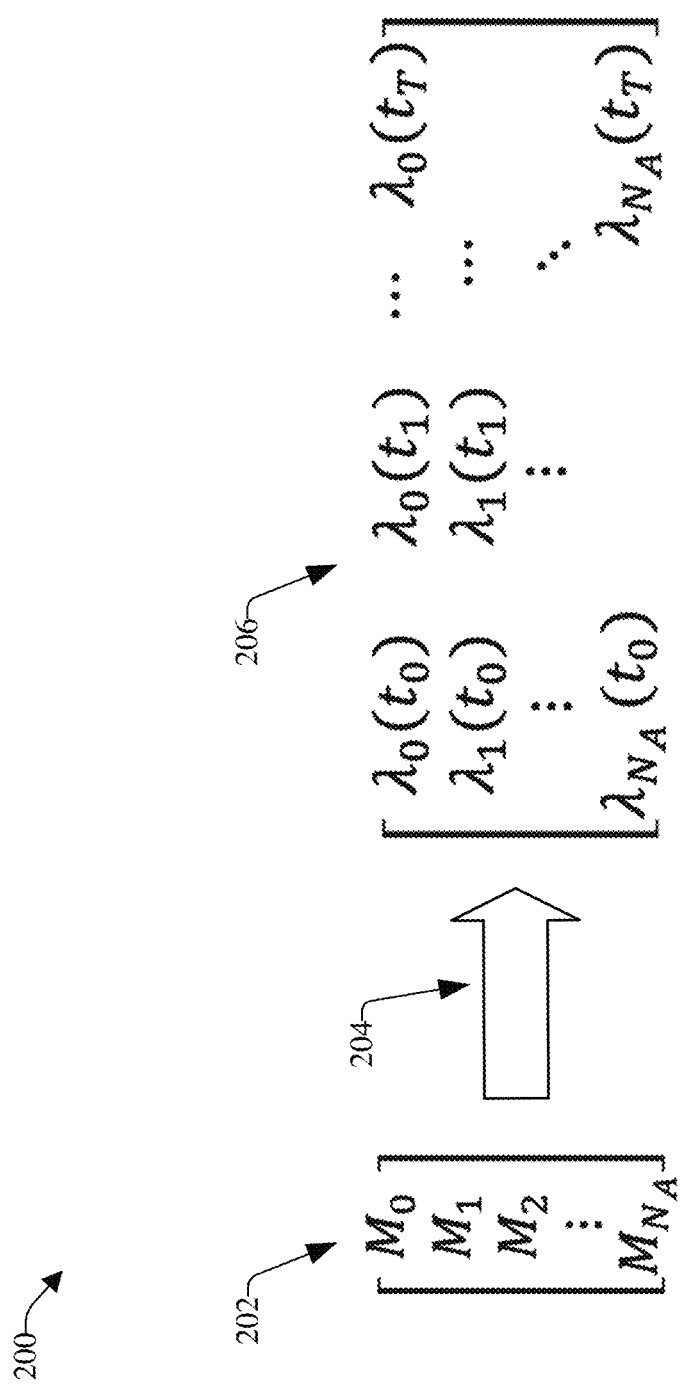
FIG. 2 depicts a diagram of example monitoring job execution process, in accordance with various aspects and embodiments of the disclosed subject matter.

Referring briefly to FIG. 2 (along with FIG. 1), FIG. 2 depicts a diagram of example monitoring job execution process 200, in accordance with various aspects and embodiments of the disclosed subject matter. In accordance with the example monitoring job execution process 200, there can be a monitoring job set 202, M, comprising a set (e.g., a group or sequence) of $N_A$ monitoring jobs, wherein $M \equiv [M_0, M_1, M_2, \ldots, M_{N_A}]$. As indicated at reference numeral 204 of the example monitoring job execution process 200, the monitoring job component 112 can execute the monitoring jobs of the monitoring job set 202 on the quantum computer 102 and can extract system parameters (which also can be referred to as monitoring parameters) associated with the quantum computer 102 that can be produced based on the execution of the monitoring job set 202. For instance, based on the execution of the set of monitoring jobs, the monitoring job component 112 (or another component of the CMC 110) can monitor or receive (e.g., collect or obtain) data (e.g., readout results or readout determinations) produced as an output from the quantum computer 102 as a result of the execution of the set of monitoring jobs. The monitoring job component 112 (or another component of the CMC 110) can analyze the data output from the quantum computer 102 as a result of the execution of the set of monitoring jobs. Based on the results of the analysis of such output data, the monitoring job component 112 (or another component of the CMC 110) can infer, estimate, determine (e.g., calculate), derive, or measure the system parameters associated with the quantum computer 102 at each time instance (e.g., time step) of a desired number of time instances, $N_T$, to generate a set of system parameters over the desired number of time instances.

As indicated at reference numeral 206 of the example monitoring job execution process 200, the monitoring job component 112 can create a parameter buffer, P, comprising the set (e.g., a collection) of system parameters (e.g., parameter values of the system parameters for the desired number of time instances, $N_T$) that can be produced based on (e.g., in response to) the execution of the set of $N_A$ monitoring jobs on the quantum computer 102 over the desired number of time instances, $N_T$. In some embodiments, the parameter values of the parameter buffer can be arranged or structured in the form of a matrix (e.g., accumulated parameter buffer matrix, P) of system parameters $\lambda_i(t_j)$, where i can be the system parameter number (e.g., from 0 up to $N_A$ system parameters) and j can be the time step index (e.g., from 0 up to T time steps), such as depicted in FIG. 2 and described herein. The parameter buffer can be relatively sparse or dense, as desired. For instance, a parameter buffer, if relatively sparse, can comprise a relatively smaller number of system parameter entries, due to evaluation of a relatively smaller number of system parameters and/or using a relatively smaller number of time steps during execution of the monitoring jobs. In contrast, a parameter buffer, if relatively dense, can comprise a relatively larger number of system parameter entries, due to evaluation of a relatively larger number of system parameters and/or using a relatively larger number of time steps during execution of the monitoring jobs.

In accordance with various embodiments, the CMC 110 (e.g., the calibration agent 116) can utilize the set of system parameters (e.g., the parameter buffer comprising the system parameter values) directly to determine the calibration strategy for calibrating the quantum computer 102 and/or other quantum computers (e.g., enhancing one or more parameters associated with the quantum component 102), or the CMC 110 can utilize the set of parameters to determine a set of system state parameters associated with the quantum computer 102 that can be utilized by the calibration agent 116 to determine the calibration strategy for calibrating the quantum computer 102 and/or other quantum computers, such as described herein.

To facilitate determining the set of system state parameters, the modeler component 114 can analyze the set of system parameters and/or can apply a desired modeling function ($\chi$) or process (e.g., a statistical process control (SPC) function or process; a stochastic process function or process; or other desired modeling function or process) to the set of system parameters. Based on the analysis results or applying of the desired modeling function or process to the set of system parameters, the modeler component 114 can determine or generate (e.g., produce) a set of system state parameters that can desirably model the system state associated with the quantum computer 102.

Figure 3:
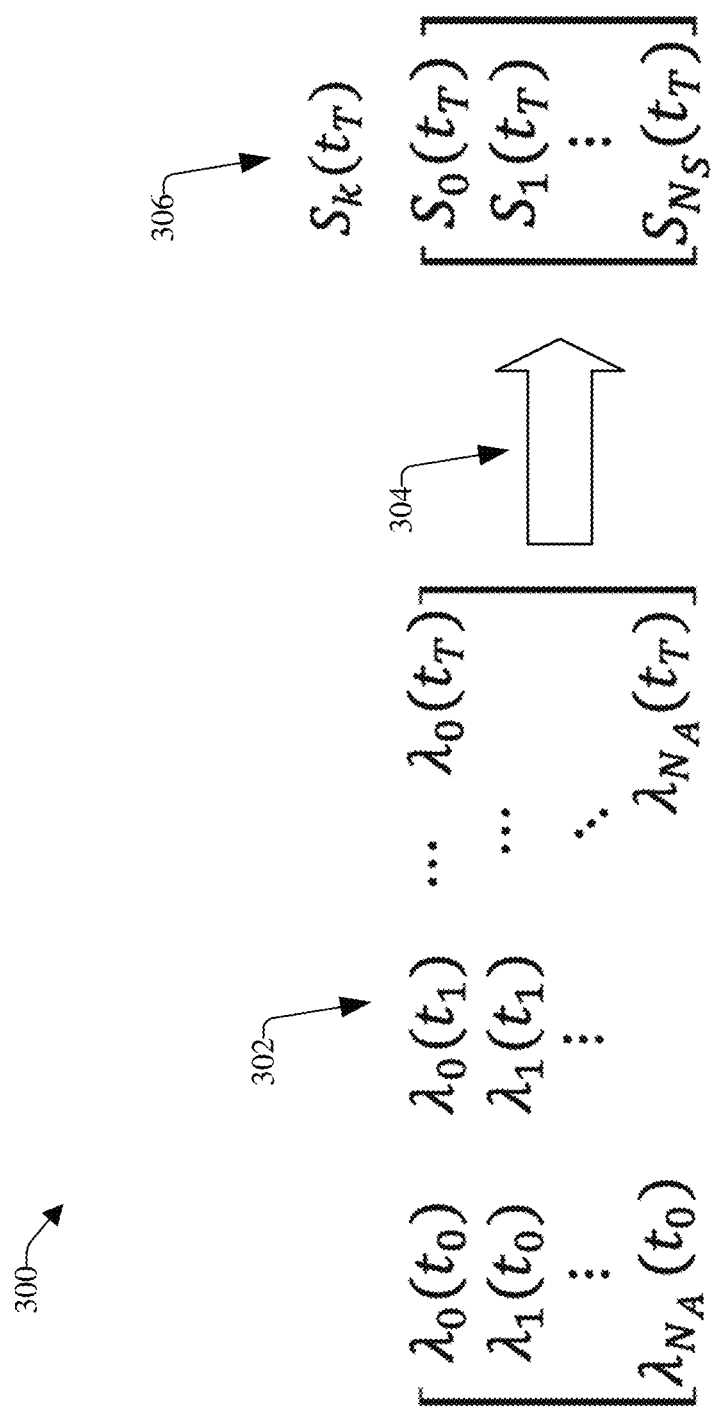
FIG. 3, illustrates a diagram of example system state modeling process, in accordance with various aspects and embodiments of the disclosed subject matter.

In that regard, turning briefly to FIG. 3 (along with FIG. 1), FIG. 3 illustrates a diagram of example system state modeling process 300, in accordance with various aspects and embodiments of the disclosed subject matter. As indicated at reference numeral 302 of the example system state modeling process 300, the modeler component 114 can utilize the set of system parameters (e.g., the system parameter buffer, P) as data input for the system state modeling process 300. As indicated at reference numeral 304 of the example system state modeling process 300, the modeler component 114 can analyze and perform system state modeling on the set of system parameters to produce a representation of the system state (e.g., $\chi(P)=S_k(t_T)$) based on the desired modeling function ($\chi$) or process (e.g., SPC function or process; stochastic process function or process; or other desired modeling function or process). The representation of the system state, $S_k$, associated with the quantum computer 102 frequently can characterize, capture, or indicate whether one or more of the underlying system parameters (e.g., $\lambda_i$) have changed significantly (e.g., changed, drifted, deviated, shifted, or moved by a defined threshold amount of change of parameter value) from their normal statistical fluctuations. A significant change in a system parameter can be an indication that calibration of or associated with the system parameter can be desirable (e.g., suitable, warranted, useful, or beneficial) to enhance the system parameter (e.g., improve or optimize the system parameter). By using the system state representation, $S_k(t_T)$, the calibration agent 116 does not have to learn specifics about each system parameter, $\lambda_i$, but instead can learn to respond to input data based on the drift or change in the statistical distributions of the system parameter, $\lambda_i$. This can enable the calibration agent 116 to use data from across quantum computers to train a single calibration agent, which can be applied to all desired quantum computers, such as described herein.

As indicated at reference numeral 306 of the example system state modeling process 300, based on the system state modeling performed on the set of system parameters associated with the quantum computer 102, the modeler component 114 can determine and/or produce the set system state parameters, $S_k(t_T)$, comprising respective system state parameters (e.g., system state parameter values) for the T time steps. In some embodiments, the system state parameter values of the system state can be arranged or structured in the form of a matrix (e.g., system state parameter matrix) that can comprise the number $N_S$ of system state parameters (e.g., $S_k(t_T)=[S_0(t_T), S_1(t_T), S_2(t_T), \ldots, S_{N_S}(t_T)]$), such as depicted at reference numeral 306 in FIG. 3 and described herein. In some embodiments, the modeling function can produce the set of system state parameter values as a vector representation of the system state, $S_k$, associated with the quantum computer 102. In certain embodiments, the system state, $S_k$, can be or represent a flattened parameter buffer, P, such as described herein.

With further regard to the system state modeling process, as disclosed, the modeler component 114 can utilize SPC to facilitate performing system state modeling associated with the quantum computer 102. SPC is a technique that can be employed to facilitate monitoring and controlling processes, and detecting anomalies (e.g., statistical anomalies or deviations) in the variables being monitored from a baseline or defined value (e.g., a mean value, a median value, a maximum value, a minimum value, a range of values, a standard deviation (or multiple standard deviations), or other baseline), wherein an anomaly in a variable can be an indication of a problem associated with that variable. In some embodiments, the modeler component 114 can determine whether an anomaly (e.g., statistically significant anomaly or change) associated with a parameter exists based on a result of determining whether a difference between a parameter value, or a set of parameter values, and a baseline parameter value associated with the parameter can satisfy (e.g., can meet or exceed; can be at or greater than) a defined threshold amount of difference (e.g., a defined threshold amount of parameter value change). If there is a parameter value, or a set of parameter values, that satisfy the defined threshold amount of difference, this can indicate that an anomaly exists. In certain embodiments, the modeler component 114 can determine whether an anomaly (e.g., statistically significant anomaly) associated with a parameter exists based on a number of parameter values (e.g., a number of consecutive parameter values) determined to be above a baseline parameter value, or a number of parameter values (e.g., a number of consecutive parameter values) determined to be below the baseline parameter value. If there is at least a certain number of parameter values determined to be above a baseline parameter value, or if there is at least a certain number of parameter values determined to be below a baseline parameter value, this can indicate that an anomaly exists, wherein such certain number can be defined in accordance with the defined calibration management criteria.

SPC can employ a set of rules, which can be referred to as detection rules (e.g., anomaly detection rules) or Nelson rules, that can be applied to facilitate determining or detecting whether an anomaly associated with a variable (e.g., a parameter associated with the quantum computer 102) is occurring. For instance, the set of rules, given a characterization of the statistics of a parameter (e.g., system parameter), can indicate or flag situations which are unlikely to occur, and thus, can indicate that the underlying statistical distribution has significantly changed. This can provide a discrete set of Boolean values that can serve as the system state $S_k(t_T)$. It is to be appreciated and understood that, in other embodiments, the modeler component 114 can determine and generate system state parameter values that can have other values besides Boolean values. For example, the modeler component 114 can determine system state parameter values that can range from 0 to 5, 0 to 10, 0 to 100, or another desired value range, wherein respective system state parameter values can represent different characteristics of the system state of the system parameter associated with the quantum computer 102 that is under consideration.

Figure 4:
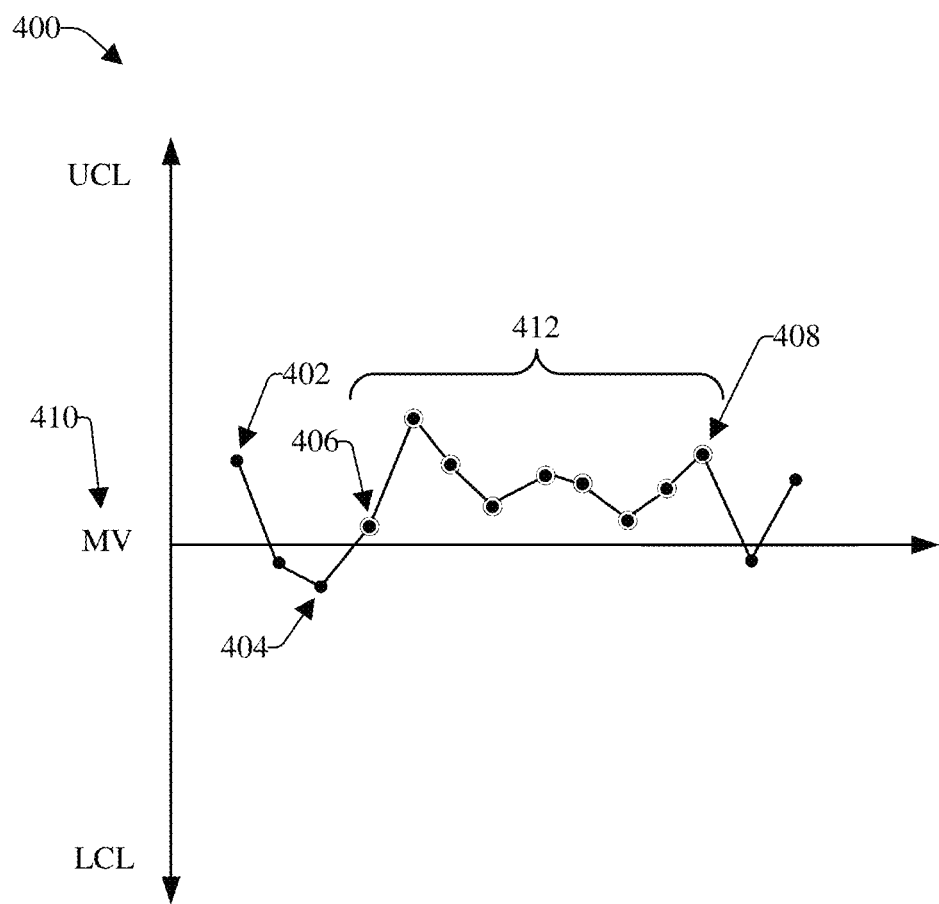
FIG. 4 depicts a diagram of an example graph of parameter values, in accordance with various aspects and embodiments of the disclosed subject matter.

One rule of the set of rules that can be desirable (e.g., useful, suitable, or beneficial) in connection with determining a calibration strategy for a quantum computer can include a rule that specifies that nine (or more) data points (e.g., parameter values) in a row that are on the same side of the mean parameter value for the parameter can indicate a prolonged bias in the data exists, which can indicate there can be an anomaly associated with the parameter. Turning briefly to FIG. 4, to graphically illustrate this rule, FIG. 4 depicts a diagram of an example graph 400 of parameter values, in accordance with various aspects and embodiments of the disclosed subject matter. The example graph 400 can comprise a set of data points (e.g., parameter values), including data points 402, 404, 406, and 408 plotted on the graph 400. In comparing the various data points on the graph 400 to the mean value (MV) 410 for the parameter, it can be observed that data point 402 is above the mean value 410 and data point 404 is below the mean value 410; and it also can be observed that there are nine consecutive data points 412, comprising data points 406 and 408, and the data points in between them, that are above the mean value 410. If the modeler component 114 evaluates the data points on this graph 400, the modeler component 114, applying the detection rule, can determine that there are nine consecutive data points 412 that are above the mean value 410, and therefore, the data indicates the detection rule has been breached (e.g., the condition of the rule has been satisfied or met), and that some kind of prolonged bias in the data exists, and accordingly, there can be an indication that an anomaly exists with regard to that parameter. Accordingly, in some embodiments, the modeler component 114 can insert a corresponding Boolean value (e.g., 1) for this parameter in set of system state parameters (e.g., in the corresponding location in the system state matrix).

If, instead, the graph 400 had shown that there were not nine consecutive data points on the same side of the mean value (and assuming that no other detection rule indicates an anomaly associated with this parameter exists), the modeler component 114, applying the detection rule, could instead determine that the data does not indicate that some kind of prolonged bias in the data exists, and accordingly, there is no indication that an anomaly exists with regard to that parameter. Accordingly, the modeler component 114 could insert a corresponding Boolean value (e.g., 0) for this parameter in set of system state parameters (e.g., in the corresponding location in the system state matrix).

Figure 5:
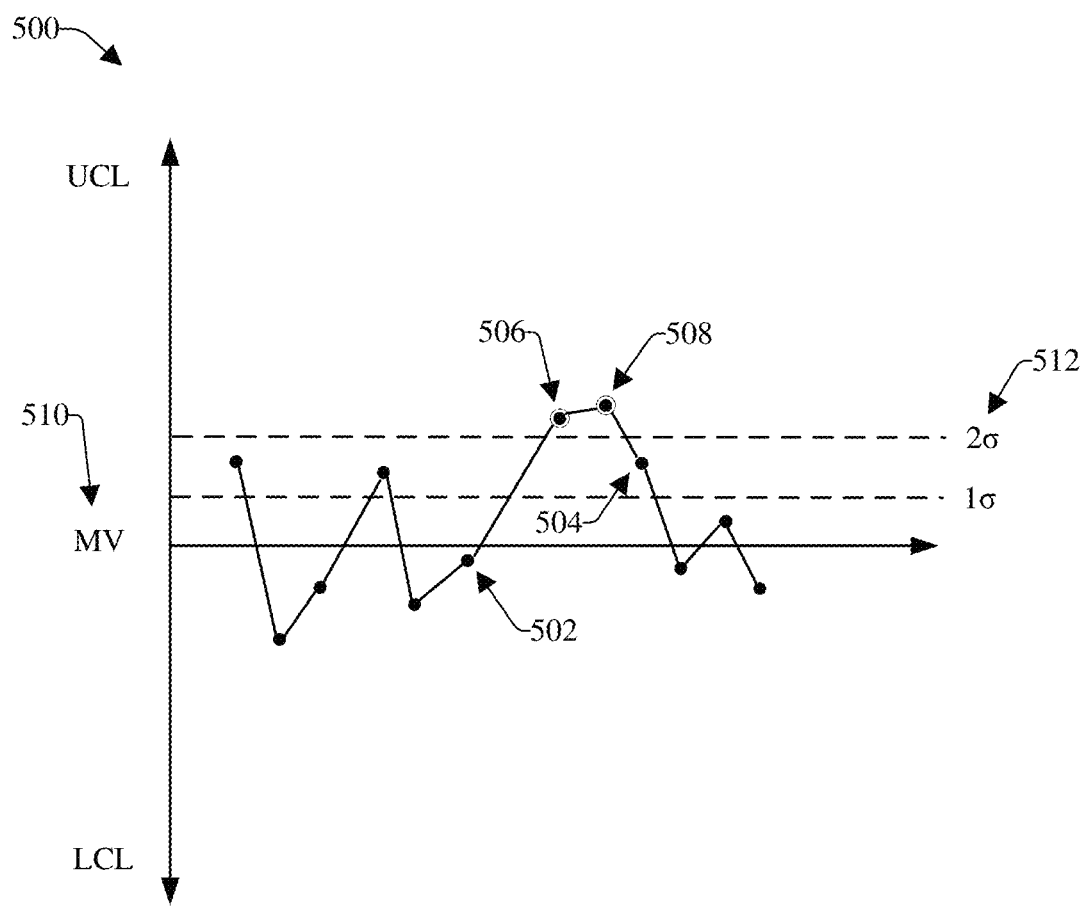
FIG. 5 presents a diagram of an example graph of parameter values, in accordance with various aspects and embodiments of the disclosed subject matter.

Another rule of the set of rules that can be a rule that specifies that two (or three) data points (e.g., parameter values) in a row that are more than two standard deviations from the mean parameter value for the parameter in the same direction can indicate that there can be an anomaly associated with the parameter. Referring briefly to FIG. 5, to graphically illustrate this other rule, FIG. 5 presents a diagram of an example graph 500 of parameter values, in accordance with various aspects and embodiments of the disclosed subject matter. The example graph 500 can comprise a set of data points (e.g., parameter values), including data points 502, 504, 506, and 508 plotted on the graph 500. In comparing the various data points on the graph 500 to the mean value (MV) 510 for the parameter and the second standard deviation 512 (2σ) from the mean value 510, it can be observed that data point 502 is below the mean value 510 and data point 504 is above the mean value 510, but is less than two standard deviations above the mean value 510; and it also can be observed that, in between data point 502 and data point 504 on the graph 500, there are two consecutive data points 506 and 508 that are above the mean value 510 by at least two standard deviations. If the modeler component 114 evaluates the data points on this graph 500, the modeler component 114, applying the detection rule, can determine that there are two consecutive data points 506 and 508 that are above the mean value 510 by at least two standard deviations in the same direction, and therefore, the data indicates that this detection rule has been breached (e.g., the condition of this rule has been satisfied), and there can be an anomaly with regard to that parameter. Accordingly, in certain embodiments, the modeler component 114 can insert a corresponding Boolean value (e.g., 1) for this parameter in the set of system state parameters (e.g., in the corresponding location in the system state matrix).

If, instead, the graph 500 had shown that there were not two consecutive data points at least two standard deviations away from the mean value 510 in the same direction (and assuming that no other detection rule indicates an anomaly associated with this parameter), the modeler component 114, applying the detection rule, could instead determine that the data does not indicate that an anomaly exists with regard to that parameter. Accordingly, the modeler component 114 could insert a corresponding Boolean value (e.g., 0) for this parameter in the set of system state parameters (e.g., in the corresponding location in the system state matrix).

It is to be appreciated and understood that these two detection rules are merely two non-limiting examples of SPC detection rules that can be utilized (e.g., applied) to facilitate determining or detecting whether an anomaly associated with a parameter is occurring, and, additionally or alternatively, the modeler component 114 can employ one or more of the other SPC detection rules, or one or more other rules that can be utilized in the SPC process (e.g., consistent with the SPC process) to facilitate detecting whether an anomaly associated with a parameter is occurring, in accordance with the disclosed subject matter.

In certain embodiments, the modeler component 114 can utilize stochastic process modeling to facilitate performing system state modeling associated with the quantum computer 102. Stochastic process modeling is a modeling technique that the modeler component 114 can utilize to detect (e.g., determine or identify) when a parameter value, or a set of parameter values, for a parameter has drifted (e.g., changed) from a desired (e.g., intended) target parameter value (e.g., a baseline parameter value) for the parameter (e.g., a parameter value, or a set of parameter values, has changed by at least the defined threshold amount of parameter value change from the desired target parameter value). In some embodiments, the desired target parameter value can be the mean parameter value, which can be determined based on a desired set of data points (e.g., set of parameter values), although, in other embodiments, a desired target parameter value can be a different type of value, such as described herein. If the modeler component 114 determines that the parameter value, or set of parameter values, has changed by at least the defined threshold amount of parameter value change from the desired target parameter value, this can indicate that an anomaly exists with regard to the parameter. In accordance with the stochastic process modeling, if the modeler component 114 determines that an anomaly exists with regard to a parameter, the modeler component 114 can insert a corresponding Boolean value (e.g., 1) for this parameter in the set of system state parameters (e.g., in the corresponding location in the system state matrix). If, instead, the modeler component 114 determines that no anomaly has been detected with regard to the parameter, the modeler component 114 can insert a corresponding Boolean value (e.g., 0) for this parameter in the set of system state parameters (e.g., in the corresponding location in the system state matrix).

In some embodiments, the modeler component 114 can model the system parameters $\lambda_i(t_j)$ of the parameter buffer, P, as realizations of a stochastic process $\zeta_i(t_j) \rightarrow \lambda_i(t_j)$, where the modeler component 114 can model each stochastic process, for example, as follows: a nonzero-mean, drift-diffusion process with random resets, modeled starting at $t=t_0$ for a generic parameter, $$\zeta(t \geq t_0) = \sum_{j \geq 0} [\mu_j + \delta_j t + \eta_j(t)] \Theta_j(t),$$

with $n_j(t)$ a stationary Gaussian white noise, $$\langle \eta_j(t)\eta_j(t') \rangle = \sigma_j^2 \delta(t-t'),$$

and $\Theta_j(t)=1$ only in the time interval $t_j \leq t < t_{j+1}$, and 0 otherwise, and wherein jumps can occur at the times $t_j$, $j>0$.

The modeler component 114 can utilize stochastic process modeling to facilitate performing system state modeling associated with the quantum computer 102 and detecting anomalies (e.g., significant anomalies or changes) in parameter values associated with system parameters. For instance, when examining data series of typical (informative) parameters, the data series can manifest fluctuations, drifts, and/or jumps in the data. The drifts or jumps (e.g., amount of change) in the data, if significant enough, can indicate or represent an anomaly associated with a parameter. In some instances, fluctuations in the data can indicate or represent an anomaly associated with a parameter. However, certain transient fluctuations (e.g., a certain fluctuation of a single or small number of parameter values) in the data, for example, even if there is a relatively large transient fluctuation, still may be determined (e.g., by the modeler component 114) to not indicate or represent an anomaly associated with a parameter, depending in part on the criteria (e.g., calibration management criteria) utilized for determining what constitutes an anomaly for a particular parameter, wherein the criteria can vary depending on the type of parameter and/or other factors. With regard to data series associated with parameters, the modeler component 114 can employ Bayesian estimation (e.g., using an artificial intelligence (AI) component, such as disclosed herein) to estimate the parameter values of the parameters and estimate a target parameter value (e.g., a mean parameter value or other target parameter value) for each parameter. The modeler component 114 can employ stochastic process modeling on the data series of estimated parameter values, and the estimated target parameter value for each parameter, to desirably (e.g., reliably, suitably or accurately) distinguish between jumps and true drifts in the data from transient fluctuations in the parameter values, and/or distinguish between significant anomalies (e.g., substantial changes, fluctuations, jumps, or drifts) in the parameter values and insignificant anomalies (e.g., smaller or transient changes or fluctuations) in the parameter values.

For instance, from the estimated parameter values and estimated target parameter values (e.g., as estimated using Bayesian estimation or otherwise estimated using another technique), the modeler component 114 can evaluate (e.g., compare) the parameter values (e.g., the distribution of parameter values) in relation to the estimated target parameter value for each parameter and one or more conditions (e.g., as applicable to a particular parameter), in accordance with the defined calibration management criteria. The one or more conditions, which can be specified by the defined calibration management criteria, can comprise, for example, a condition relating to a defined threshold amount of parameter value change or difference (e.g., deviation) from a target parameter value, a condition relating to a difference of a parameter value in relation to other parameter values in proximity to the parameter value (e.g., other parameter values adjacent to the parameter value or within a defined amount of time or defined number of time steps of the parameter value in the data series), or another desired condition. Based at least in part on the results of such evaluation, the modeler component 114 can determine whether there is an anomaly (e.g., a defined threshold amount of change or difference in a parameter value as compared to the target parameter value; or a substantial difference in a parameter value relative to other parameter values in proximity to the parameter value; or another result that can indicate a change in the data distribution of the parameter values relative to the target parameter value, such as the mean parameter value) associated with a particular parameter, in accordance with the defined calibration management criteria. In accordance with the stochastic process modeling, the modeler component 114 can determine a system state parameter value for each parameter based on the result of determining whether an anomaly has been detected for the parameter, such as described herein. Based on such system state modeling, the calibration agent 116 can desirably identify significant changes in underlying system parameter values, while ignoring or disregarding insignificant changes (e.g., insignificant transient fluctuations) in underlying system parameter values.

Figure 6:
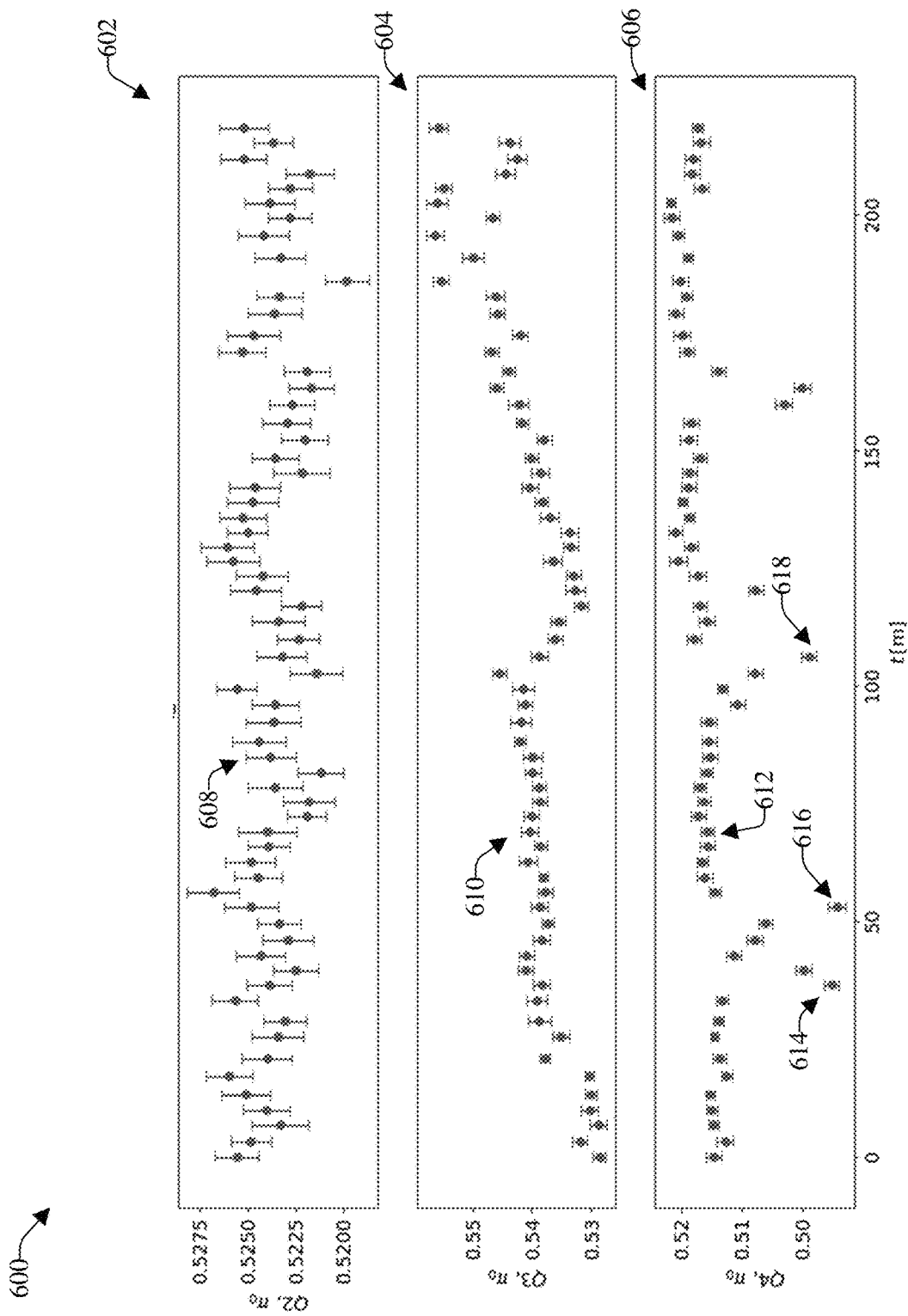
FIG. 6 presents a diagram of example data series of typical parameters that can manifest fluctuations, drifts, and jumps in the data.

Referring briefly to FIG. 6, FIG. 6 presents a diagram of example data series 600 of typical parameters that can manifest fluctuations, drifts, and jumps in the data. The example data series 600 can comprise data series 602, data series 604, and data series 606, comprising respective data points for over time (t[m]). As can be observed in the data points, there can be certain data points, such as data point 608, data point 610, and data point 612 that can be in line with other data points (e.g., data points proximately located to those data points in time), and there can be other data points, such as data point 614, data point 616, or data point 618 that can be significantly different in value from other data points that are proximately located to those data points in time.

Figure 7:
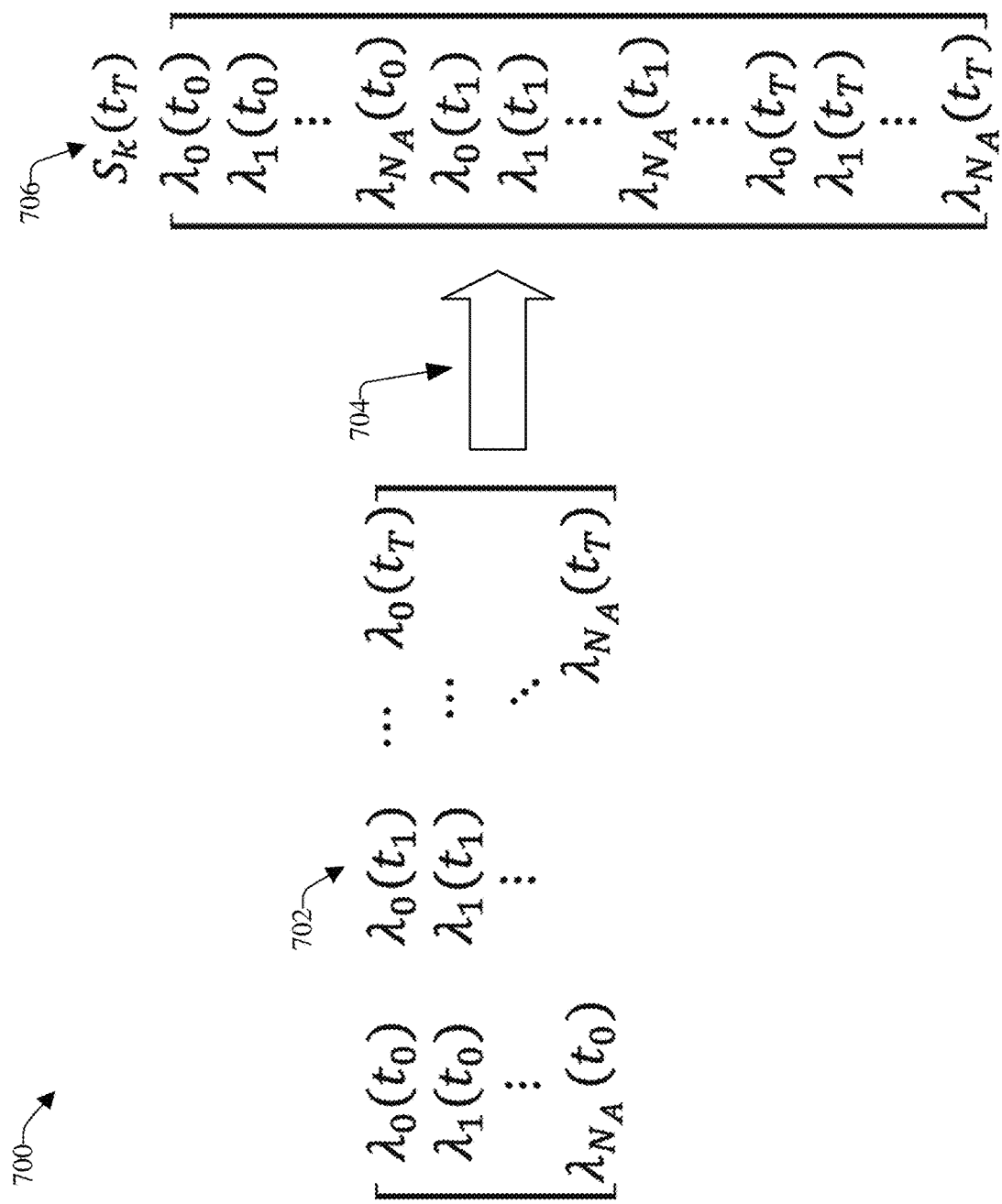
FIG. 7 illustrates a diagram of example direct system state modeling process, in accordance with various aspects and embodiments of the disclosed subject matter.

In other embodiments, alternatively, the CMC 110 can employ direct state modeling by directly passing the set of system parameters associated with the quantum computer 102 to the calibration agent 116 for analysis and processing, to facilitate performing direct system state modeling associated with the quantum computer 102. Turning briefly to FIG. 7 (along with FIG. 1), FIG. 7 illustrates a diagram of example direct system state modeling process 700, in accordance with various aspects and embodiments of the disclosed subject matter. As indicated at reference numeral 702 of the example direct system state modeling process 700, the CMC 110 can utilize the set of system parameters (e.g., the system parameter buffer, P) as direct data input for the direct system state modeling process 700. As indicated at reference numerals 704 and 706 of the example direct system state modeling process 700, the CMC 110 can employ system state modeling on the set of system parameters to produce a representation of the system state (e.g., $\chi(P)=S_k(t_T)$) such that each of the system parameters can utilized as a representation of the system state of the quantum computer 102. In some embodiments, the system state parameter values of the system state (e.g., the set of system parameters directly used as the state modeling of the quantum computer 102) produced from the example direct system state modeling process 700 can be arranged or structured in the form of a matrix (e.g., system state parameter matrix), such as depicted at reference numeral 706 in FIG. 7.

Figure 8:
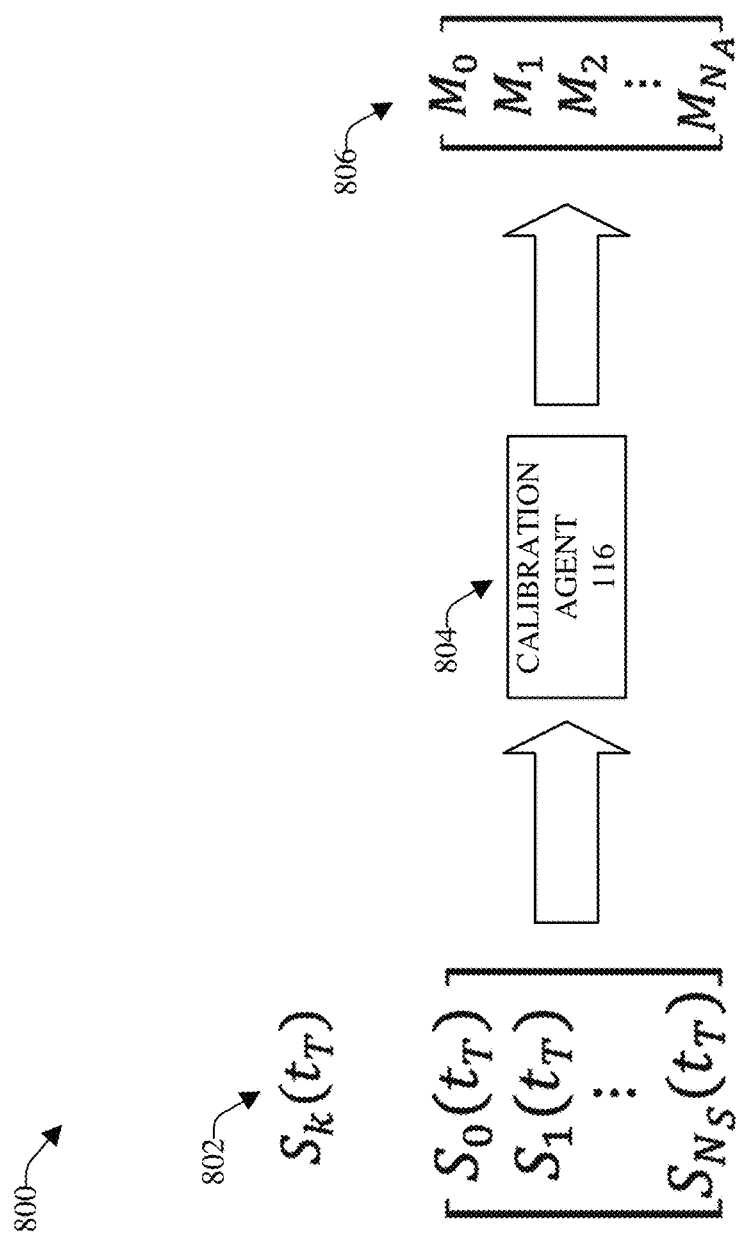
FIG. 8 depicts a diagram of example calibration-related action determination process that can be employed to facilitate calibration of parameters associated with a quantum computer, in accordance with various aspects and embodiments of the disclosed subject matter.
Figure 9:
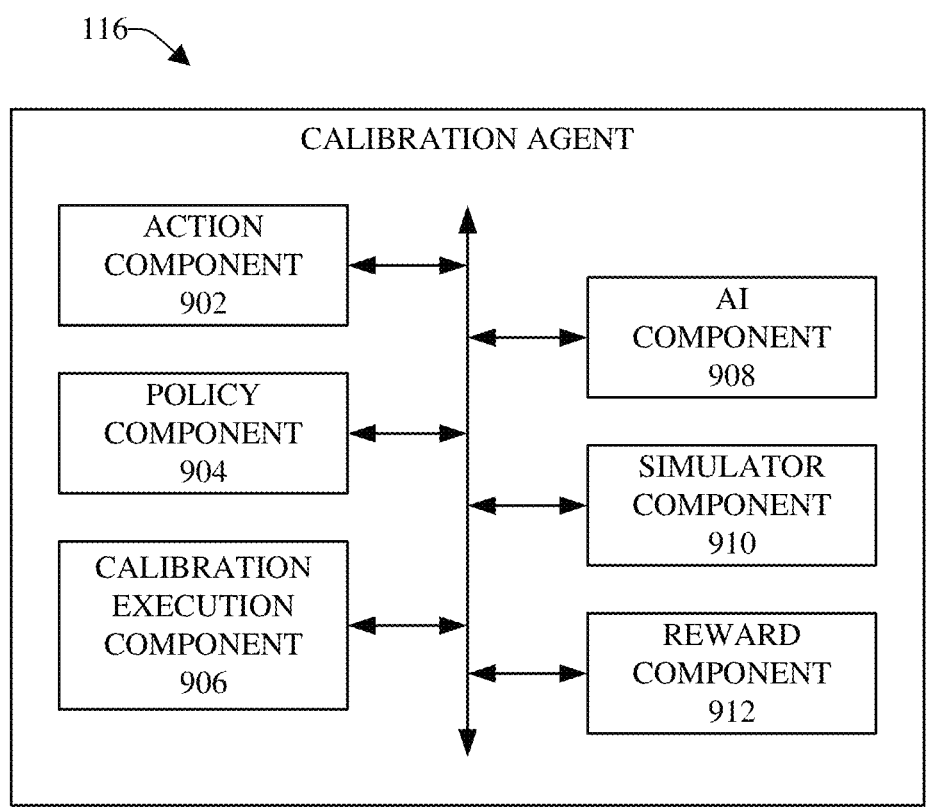
FIG. 9 illustrates a block diagram of an example calibration agent, in accordance with various aspects and embodiments of the disclosed subject matter.

Referring to FIGS. 8 and 9 (along with FIG. 1), FIG. 8 depicts a diagram of example calibration-related action determination process 800 that can be employed to facilitate calibration (e.g., automatic or dynamic calibration) of parameters associated with a quantum computer (e.g., quantum computer 102), and FIG. 9 illustrates a block diagram of an example calibration agent 116, in accordance with various aspects and embodiments of the disclosed subject matter. As indicated at reference numeral 802 of the example calibration-related action determination process 800, the set of system state parameters, $S_k(t_T)$, associated with the quantum computer 102 can be input to the calibration agent 116 for analysis and processing by the calibration agent 116, wherein the set of system state parameters can characterize or indicate whether any of the underlying system parameters, $\lambda_i$, associated with the quantum computer 102 have changed significantly (e.g., changed by at least a defined threshold amount).

As indicated at reference numeral 804 of the example calibration-related action determination process 800, the calibration agent 116, employing an action component 902, can analyze the set of system state parameters associated with the quantum computer 102 and the policy (e.g., of the policy component 904), π, relating to calibrations, and, based on the results of such analysis, the calibration agent 116 can determine (e.g., compute) an action, $\alpha(t_T)$, to perform to desirably (e.g., suitably, enhancedly, or optimally) calibrate (e.g., enhance the performance of) one or more system parameters associated with the quantum computer 102 (e.g., $\pi(S_k(t_T))=\alpha(t_T)$), determine a reward associated with calibration of the quantum computer 102, and/or update the policy, in accordance with the defined calibration management criteria, such as described herein. A reward can be determined (e.g., by the calibration agent 116) for a given action taken (e.g., performed) with regard to the quantum computer (e.g., performing a calibration job or strategy, making a determination that no calibration job is to be performed, or other type of action taken with regard to the quantum computer 102 or other quantum computer), such as more fully described herein. As indicated at reference numeral 806 of the example calibration-related action determination process 800, the process 800 can proceed back to executing a set of monitoring jobs, which can be the same set of monitor jobs or a different set of monitoring jobs, as described herein.

With further regard to reference numeral 804 of the process 800, the action, α, can comprise performing a calibration job (e.g., a performance enhancement job or task), $C_i$, to calibrate a system parameter associated with the quantum computer 102, performing a calibration strategy (e.g., a parameter enhancement strategy), C, for calibration of one or more system parameters associated with the quantum computer 102, and/or a no action determination, in accordance with the policy, wherein a no action determination can mean that the quantum computer 102 can be available for other jobs by users.

The policy, π, can be or can comprise a desired goal of the calibration routine (e.g., reinforcement learning routine or other calibration routine). The policy can specify, dictate, or indicate what action to perform based on the system state, $S_k$, associated with the quantum computer 102. The calibration agent 116 can determine, update, implement, or execute the policy in one or more of a variety of ways, including, for example, using AI-based analysis (e.g., analysis using AI or machine learning (ML) techniques or models and/or deep neural networks (e.g., trained deep neural networks)), decision trees, lookup tables, or other desired means, such as described herein. The policy, π, can indicate or specify, and/or can be used to determine, what parameters associated with the quantum computer 102 are to be calibrated, an ordering of the calibration tasks to be performed to calibrate one or more system parameters associated with the quantum computer 102, a schedule for performing calibrations of one or more system parameters associated with the quantum computer 102, and/or other calibration-related actions that can be performed by the calibration agent 116 to facilitate desirably (e.g., suitably, enhancedly, or optimally) calibrating parameters associated with the quantum computer 102, in accordance with the defined calibration management criteria.

A parameter enhancement (e.g., improvement or optimization) job (e.g., task), $C_i$, can comprise the calibration agent 116 performing a parameter estimation and updating one or more system parameters associated with the quantum computer 102 (e.g., a qubit(s) (e.g., 104, 106, or 108) or other component of the quantum computer 102, qubit transition frequency, multi-qubit gates, higher order qubit gates, Xp amplitude, CR amplitude, $T_1$, $T_2$, low frequency noise, readout error, quantum computer temperature, or other system parameter). A parameter enhancement job with regard to a system parameter also can be referred to herein as a calibration of a parameter (e.g., system parameter).

A parameter enhancement strategy (e.g., calibration strategy), C, can comprise a defined sequence of $N_C$ parameter enhancement jobs (e.g., calibration jobs), $C_i$, that can enhance (e.g., improve, increase, or optimize) performance of the quantum computer 102 (e.g., enhance performance of the qubits of the quantum computer 102), wherein $C \equiv [C_0, C_1, C_2, \ldots, C_{N_C}]$. The defined sequence of $N_C$ parameter enhancement jobs, $C_i$, can comprise parameter enhancement jobs that can be arranged or structured in relation to each other in a specific order (e.g., specific sequence) for performance of such parameter enhancement jobs by the calibration agent 116 in accordance with the specific order. A parameter enhancement strategy with regard to a set of system parameters, comprising one or more system parameters, also can be referred to herein as a calibration strategy.

The calibration agent 116, employing the calibration execution component 906, can execute the calibration strategy (e.g., parameter enhancement strategy, C) to perform the one or more calibration jobs, in accordance with the specified order for performance of such calibration jobs, to desirably calibrate one or more system parameters associated with the quantum computer 102 and/or another quantum computer. In some embodiments, the calibration agent 116 can implement or perform the parameter enhancement strategy, C, using one or more desired calibration (e.g., automatic calibration) routines. It is noted that respective (e.g., different) calibration jobs can take respective amounts of time to perform, and, accordingly, respective calibration strategies can take respective amounts of time to perform. The one or more system parameters associated with the quantum computer 102 and/or another quantum computer can be updated (e.g., adjusted or modified), and performance of the quantum computer 102 and/or the other quantum computer thereby can be enhanced (e.g., improved or optimized), based on the performance of the one or more calibration jobs in the specified order.

In some embodiments, the calibration agent 116 can train itself to enhance determinations of calibration jobs to perform and calibration strategies to perform to enhance system parameters associated with the quantum computer 102 and/or other quantum computers, and to enhance performance of the quantum computer 102 and/or other quantum computers. For instance, the calibration agent 116 can comprise or be associated with an AI component 908 that can perform an analysis on data comprising or relating to operation of the quantum computer 102 (e.g., operation of the qubits (e.g., 104, 106, and/or 108) and/or other quantum components or circuitry of the quantum computer), system parameters and/or system state parameters associated with the quantum computer 102, policy information of the policy, reward-related information (e.g., reward values or functions, performance reward values or functions, availability rewards values or functions), action-related information (e.g., performance of calibration jobs or calibration strategy, and/or determinations to not perform a calibration job), metadata, historical information relating thereto, or other desired types of information.

In some embodiments, in connection with or as part of such an analysis by the AI component 908, the AI component 908 can employ, build (e.g., construct or create), and/or import, AI and/or ML techniques and algorithms, AI and/or ML models, neural networks (e.g., deep neural networks trained using the AI component 908), and/or graph mining to render and/or generate predictions, inferences, calculations, prognostications, estimates, derivations, forecasts, detections, and/or computations that can facilitate making one or more determinations relating to calibration of quantum computers. For instance, the calibration agent 116 can input data, comprising a group of system state parameter values (or a group of system parameter values) associated with the quantum computer 102, and/or other desired information relating to operation of the quantum computer 102, into an AI-based model (e.g., AI model, ML model, or deep neural network). The pre-processing of the system parameter values to generate system state parameter values associated with the quantum computer (e.g., by performing SPC or stochastic process modeling) can enable the AI-based model to desirably (e.g., suitably, enhancedly, or optimally) analyze and process the input data (e.g., the system state parameter values), train (e.g., iteratively train) the AI-based model, and produce inferences, predictions, estimates, or determinations relating to calibration of quantum computers that can be provided as an output from the AI-based model. For instance, the training and performance of the AI-based model through the inputting of the system state parameter values associated with the quantum computer 102 typically can be more desirable (e.g., better, enhanced, or optimal), as compared to if an AI-based model had otherwise been trained by inputting system parameter values or other raw (or rawer) data into the AI-based model.

As part of the iterative training process, the calibration agent 116 can continue to input data (e.g., a next group(s) of system state parameters or other desired information) into the AI-based model, on an ongoing and iterative basis, as such data is produced (e.g., by the modeler component 114), and the AI component 208 can have the AI-based model analyze and process such input data, as it continues to be input to the AI-based model, to iteratively train and enhance the AI-based model to render (e.g., provide, generate, or output) inferences, predictions, estimates, or determinations relating to calibration of quantum computers. As more training iterations are performed on the AI-based model, over time, the AI-based model can become increasingly improved, and, accordingly, the inferences, predictions, estimates, or determinations relating to calibration of quantum computers produced by the AI-based model can become increasingly improved. For instance, as the AI component 208 iteratively trains the AI-based model over time, the AI-based model (e.g., trained AI-based model) can learn (e.g., better or increasingly learn) which action(s) (e.g., performing a particular calibration job, performing a particular sequence of calibration jobs, or a particular scheduling of performance of calibration jobs, under certain conditions associated with the quantum computer) can desirably enhance performance of the quantum computer(s) while not making the quantum computer(s) unavailable for use (e.g., use to perform quantum operations and calculations) for undesirable amounts of time due to calibration jobs being performed. Also, as the AI component 208 iteratively trains the AI-based model over time, the AI-based model can learn (e.g., better or increasingly learn) which other action(s) (e.g., performing a different calibration job, performing a different sequence of calibration jobs, or a different scheduling of performance of calibration jobs, under certain conditions associated with the quantum computer) does not enhance performance of the quantum computer(s) and/or results in the quantum computer(s) being unavailable for use for an undesirable (e.g., an unsuitable, undue, or unnecessarily large) amount of time due to calibration jobs being performed.

For example, the AI component 208, employing the trained AI-based model, can analyze the data (e.g., system state parameter values and/or other desired information) can render (e.g., produce as output data) inferences, estimates, or predictions relating to calibration of the quantum computer 102 that the calibration agent 116 can analyze and use to make various desired determinations relating to calibration of the quantum computer 102. For instance, based on the inferences, estimates, or predictions relating to calibration of the quantum computer 102, the calibration agent 116 can determine whether a particular calibration job is to be performed, determine whether the particular calibration job will enhance (e.g., improve or optimize) a system parameter associated with the quantum computer 102 and/or performance of the quantum computer 102, determine an order (e.g., sequence) of performing calibrations jobs, determine a calibration strategy, comprising a group of calibration jobs to be performed in a specified order, and/or determine scheduling of performance of calibration jobs or a calibration strategy. Also, based on the inferences, estimates, or predictions relating to calibration of the quantum computer 102, the calibration agent 116 can determine one or more monitoring jobs to execute or an update (e.g., modification or change) to monitoring jobs to execute that can enhance detection of anomalies in system parameter values.

As another example, based on the inferences, estimates, or predictions relating to calibration of the quantum computer 102, the calibration agent 116 can determine a policy relating to calibration of a quantum computer or an update (e.g., modification or change) to the policy that can enhance performance of the quantum computer. In connection with determining or updating the policy, based on the inferences, estimates, or predictions relating to calibration of the quantum computer 102, the calibration agent 116 can determine a benefit or gain from performing a calibration job or strategy associated with a quantum computer (e.g., an amount of improvement, increase, or optimization in performance of a system parameter, qubit, and/or quantum computer resulting from performing a calibration job or strategy associated with a quantum computer). Also, based on the inferences, estimates, or predictions relating to calibration of the quantum computer 102, the calibration agent 116 can determine an impact or cost associated with performing a calibration job or strategy associated with a quantum computer (e.g., time costs associated with performing a calibration job or strategy associated with a quantum computer, quantum computer availability costs relating to the quantum computer being unavailable due to calibration being performed on the quantum computer, resource costs associated with performing a calibration job or strategy associated with a quantum computer, financial costs associated with performing a calibration job or strategy associated with a quantum computer, or other type of impact or cost).

In some embodiments, based on the inferences, estimates, or predictions relating to calibration of the quantum computer 102, the calibration agent 116 can determine reward-related values. In that regard, the calibration agent 116 can determine a reward value as a function of a performance reward, $R_P$, and an availability reward, $R_A$. The performance reward can be a reward for a given action related to performance of the quantum computer 102 (e.g., fidelity of qubits (e.g., fidelity of a qubit gate, or fidelity of an entangled state of a qubit), quantum volume, or other parameter or characteristic associated with the quantum computer 102), such as described herein. The availability reward can be a reward for a given action in relation to availability of the quantum computer 102, such as described herein. In certain embodiments, the calibration agent 116 can determine the performance reward (e.g., performance reward value) based on (e.g., as a function of) the benefit or gain from performing a calibration job or strategy associated with a quantum computer, as such benefit or gain was determined by the calibration agent 116, based on the inferences, estimates, or predictions rendered by the AI-based model. The calibration agent 116 also can determine the availability reward (e.g., availability reward value) based on (e.g., as a function of) the impact or cost associated with performing a calibration job or strategy associated with a quantum computer, as such impact or cost was determined by the calibration agent 116, based on the inferences, estimates, or predictions rendered by the AI-based model.

In other embodiments, based on the inferences, estimates, or predictions relating to calibration of the quantum computer 102, the CMC 110 can make other desired determinations or inferences, such as the determinations or inferences described herein, and/or can automate one or more functions or features of the disclosed subject matter (e.g., automate one or more functions or features of or associated with the CMC 110, or other device or component).

As still another example to further illustrate the training of the AI-based model and use of such model in making calibration-related determinations or decisions, based on the results of an analysis performed on the data by the AI component 908 (e.g., the AI-based model of the AI component 908) and the training of the AI-based model, the AI component 908 (e.g., the AI-based model through its learning and training) can infer or determine that performing a particular calibration job on a system parameter associated with the quantum computer 102 at a particular time when certain system state parameters are at certain respective state parameter values can be undesirable (e.g., unsuitable or suboptimal) because the costs (e.g., unavailability of quantum computer during calibration, resource costs, financial costs, or other costs) associated with performing the particular calibration job at the particular time is higher than the benefit (e.g., the amount of improvement in the system parameter or performance of the quantum computer) gained from performing the particular calibration job at the particular time. As yet another example, based on the results of an analysis performed on the data by the AI component 908 (e.g., the AI-based model of the AI component 908) and the training of the AI-based model, the AI component 908 can infer or determine a particular order or sequence that respective calibrations jobs associated with respective system parameters of a quantum computer are to be performed, as part of a calibration strategy, to achieve a desirable amount of benefit associated with performing the calibration strategy relative to costs associated with the performing the calibration strategy (e.g., achieve a highest, or at least higher, amount of benefit while incurring a relatively minimal or acceptable amount of cost). From such learning, inferences, or determinations, the calibration agent 116 can determine a desirable calibration job(s) and/or calibration strategy, comprising a group of calibration jobs to be performed in a specified order, to facilitate calibrating the quantum computer 102 and/or another quantum computer, in accordance with the policy (and corresponding calibration management criteria).

Over time, as the calibration agent 116 (e.g., reinforcement learning agent) becomes increasingly and desirably trained (e.g., over a number of iterations of performing calibrations associated with the quantum computer(s), updating the policy (e.g., which can further train the calibration agent 116), determining and updating a (next) calibration job or strategy, executing the calibration job(s) or strategy, and/or performing other calibration-related tasks), the calibration agent 116 can determine calibration jobs and calibration strategies for calibrating the quantum computer 102 and/or other quantum computers (and a corresponding policy for such calibration) such that the system parameters associated with the quantum computer 102 and/or other quantum computers can be desirably calibrated to desirably enhance (e.g., improve, increase, or optimize) performance of the system parameters and the quantum computer(s) while reducing or minimizing the number of calibrations of the quantum computer(s) that have to be performed to maintain desirable performance of the quantum computer(s) and, correspondingly, reducing or minimizing the amount of time that the quantum computer(s) is unavailable for use (e.g., by users) due to calibrations being performed.

In some embodiments, the CMC 110 can facilitate training the calibration agent 116 (and/or AI component 908) by using a simulator component 910 that can perform simulations relating to operation of a quantum computer (e.g., quantum computer 102), including operation of qubits and other quantum components or circuitry, system parameters associated with the quantum computer, execution of monitoring jobs on the quantum computer, execution of calibration strategies on the quantum computer, or other aspects relating to simulating operation of the quantum computer. Based on the results of such simulations, the calibration agent 116 (and/or AI component 908 (e.g., a deep neural network of the AI component 908)) can be trained, for example, by making determinations regarding monitoring jobs to execute in a monitoring jobs set, a system state modeling technique to utilize for system state modeling, a calibration job or calibration strategy to implement to calibrate the quantum computer, a policy, and/or another calibration-related issue or aspect, in accordance with the defined calibration management criteria. This can facilitate enhancing (e.g., improving or optimizing) training of the calibration agent 116 (e.g., reducing the amount of time to train the calibration agent 116, improving the performance of the calibration agent 116) and/or reducing the amount of time that a quantum computer (e.g., quantum computer 102) is unavailable due to calibration being performed on the quantum computer.

The AI component 908 can employ various AI-based or ML-based schemes for carrying out various embodiments/examples disclosed herein. In order to provide for or aid in the numerous determinations (e.g., determine, ascertain, infer, calculate, predict, prognose, estimate, derive, forecast, detect, compute) described herein with regard to the disclosed subject matter, the AI component 908 can examine the entirety or a subset of the data (e.g., data associated operation of the quantum computer, system parameters and/or system state parameters associated with the quantum computer, policy information of the policy, rewards-related information, action-related information, metadata, historical information relating thereto, or other desired types of information) to which it is granted access and can provide for reasoning about or determine states of the system and/or environment from a set of observations as captured via events and/or data. Determinations can be employed to identify a specific context or action, or can generate a probability distribution over states, for example. The determinations can be probabilistic; that is, the computation of a probability distribution over states of interest based on a consideration of data and events. Determinations can also refer to techniques employed for composing higher-level events from a set of events and/or data.

Such determinations can result in the construction of new events or actions from a set of observed events and/or stored event data, whether or not the events are correlated in close temporal proximity, and whether the events and data come from one or several event and data sources. Components disclosed herein can employ various classification (explicitly trained (e.g., via training data) as well as implicitly trained (e.g., via observing behavior, preferences, historical information, or receiving extrinsic information) schemes and/or systems (e.g., support vector machines, neural networks, expert systems, Bayesian belief networks, fuzzy logic, or data fusion engines) in connection with performing automatic and/or determined action in connection with the claimed subject matter. Thus, classification schemes and/or systems can be used to automatically learn and perform a number of functions, actions, and/or determinations.

A classifier can map an input attribute vector, $z=(z1, z2, z3, z4, \ldots, zn)$, to a confidence that the input belongs to a class, as by $f(z)=confidence(class)$. Such classification can employ a probabilistic and/or statistical-based analysis (e.g., factoring into the analysis utilities and costs) to determinate an action to be automatically performed. A support vector machine (SVM) can be an example of a classifier that can be employed. The SVM operates by finding a hyper-surface in the space of possible inputs, where the hyper-surface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, and/or probabilistic classification models providing different patterns of independence, any of which can be employed. Classification as used herein also is inclusive of statistical regression that is utilized to develop models of priority.

During and/or as part of training of the calibration agent 116, the calibration agent 116 can employ a reward component 912 that can determine (e.g., calculate) a reward (e.g., reward value), based on a reward function and information relating to calibration associated with system parameters associated with the quantum computer 102. The reward can be a reward for a given action related to the quantum computer 102 (e.g., performing a calibration job or strategy, making a determination that no calibration job is to be performed, or other type of action), and the reward can be determined based on (e.g., as a function of) the performance reward, $R_P$, and the availability reward, $R_A$, in accordance with the defined calibration management criteria. The performance reward, $R_P$, can be a reward for a given action related to performance of the quantum computer 102 (e.g., fidelity of qubits (e.g., fidelity of a qubit gate, or fidelity of an entangled state of a qubit), quantum volume, or other parameter or characteristic associated with the quantum computer 102). The reward component 912 can determine the performance reward based on results of analyzing a performance reward function, the given action (e.g., calibration job or strategy; or determination that no calibration is to be performed), and the information relating to calibration associated with system parameters associated with the quantum computer 102. The performance reward (e.g., performance reward value or score) typically can be higher, or can be increased, when the action taken enhances (e.g., improves, increases, or optimizes) the performance of the quantum computer and typically can be lower, or can be decreased, when the action taken does not enhance, or at least is determined to not significantly enhance, the performance of the quantum computer.

The availability reward, $R_A$, can be a reward for a given action related to availability of the quantum computer 102, and the reward component 912 can determine the availability reward based on results of analyzing an availability reward function, the given action (e.g., calibration job or strategy; or determination that no calibration is to be performed), and the information relating to calibration associated with system parameters associated with the quantum computer 102. The availability reward function can take into account the amount of downtime (e.g., unavailability) of the quantum computer due to the time utilized to perform the given action. Typically, in accordance with the availability reward function (and calibration management criteria), there can be a higher availability reward (e.g., availability reward value or score) for more availability of the quantum computer 102, and conversely, there can be a relatively lower availability reward when there is higher unavailability of the quantum computer 102. Due to different calibration jobs and different calibration strategies taking different amounts of time to be completed, the availability reward, $R_A$, can be a function of the calibration strategy, C, and/or calibration job, $C_j$.

In certain embodiments, the calibration agent 116 can determine an action (e.g., a calibration strategy comprising a sequence of calibration jobs to be performed) based on a data analysis (e.g., analysis of system state parameter values and/or other desired information), such as described herein. Based on data relating to the action (e.g., the calibration strategy) that is output by the calibration agent 116 (e.g., output by the AI-based model of the calibration agent 116), the calibration agent 116 (e.g., the reward component 912 of the calibration agent 116) can determine (e.g., calculate), infer, or measure the performance reward and/or the availability reward.

The calibration agent 116 (e.g., the reward component 912 of the calibration agent 116) can determine the reward (e.g., overall reward) based on (e.g., as a function of) the reward function, the performance reward, and the availability reward (e.g., application of the reward function to the performance reward and the availability reward). In certain embodiments, the calibration agent 116 can apply respective (e.g., different) weights (e.g., weighting values) to the performance reward and the availability reward to weight or place more significance on one of them over the other. In other embodiments, the performance reward and the availability reward can be equally weighted in relation to each other. As the training of the calibration agent 116 (e.g., AI-based model of the calibration agent 116) progresses through iterative training, such as described herein, the calibration agent 116, employing the AI-based model, can determine or infer calibration-related actions to take (e.g., perform) that can improve (e.g., increase, maximize, or optimize) the performance reward and the availability reward, and accordingly, can improve the reward overall.

In a non-limiting example reward scheme, the reward component 912 can determine a reward (e.g., reward value or score) based on the fidelity of quantum circuit operations performed for a quantum system (e.g., quantum computer 102 and/or another quantum computer). For example, as error rates increase for one or more metrics for the quantum computer (e.g., a gate/qubit of the quantum computer), this may require additional shots for a quantum algorithm employed by the quantum computer to return a usable result. In this example reward scheme, the reward component 912 can determine the reward (e.g., the performance reward, and accordingly, the overall reward) associated with performing or taking an action based on the amount of net increase in overall fidelity for the quantum computer that is gained from the performance of a calibration job. For instance, a net increase in fidelity can result in a higher performance reward value, and accordingly, a higher overall reward value, and the greater the net increase in fidelity, the higher the performance reward value and/or overall reward value can be (e.g., as determined by the reward component 912).

In another non-limiting example reward scheme, the reward component 912 can determine a reward based on the ability to perform quantum circuits. For instance, operating parameters of each of the qubits may be used to predict a routing of expected circuits (e.g., circuits anticipated to be operated on the system over a given time) on the quantum system (e.g., quantum computer 102). In this example reward scheme, the length of such circuits may vary depending on the fidelity of qubits, and be restricted based on coherence times of the qubits. In this example reward scheme, the reward component 912 can determine the reward (e.g., the performance reward and/or the overall reward) based on the likelihood (e.g., as inferred, determined, or predicted by the AI component 208) that the quantum computer can execute all desired circuits over a given time. For instance, the higher the likelihood that the quantum computer can execute all desired circuits over the given time, the higher the performance reward value and/or overall reward value can be (e.g., as determined by the reward component 912) It is to be understood that the above example reward schemes can be performed individually, or in some combination with each other and/or other possible reward schemes (e.g., by the calibration agent 116).

In some embodiments, in addition to or as an alternative to utilizing AI-based analysis to facilitate determining calibration jobs or strategies and/or other actions to take to facilitate enhancing performance of the quantum computer 102 and/or other quantum computers, the calibration agent 116 can employ decision trees or lookup tables to facilitate determining desirable (e.g., suitable, enhanced, or optimal) calibration jobs or calibration strategies to perform to calibrate the quantum computer 102 and/or other quantum computers, in accordance with the defined calibration management criteria. For instance, the calibration agent 116 can determine, create, or utilize a decision tree that can be a tree-like model, with various branches and nodes, wherein the decision tree model can comprise decisions relating to performance of calibration jobs or strategies that potentially can be made and potential benefits or consequences of performance of the calibration jobs or strategies. The potential benefits or consequences can relate to, for example, costs (e.g., resource, time, and/or financial costs) and/or utility (e.g., improved or increased performance of the quantum computer and/or other benefits) associated with performance of the calibration jobs or strategies. Each node of the model (e.g., leaf of the tree-like structure) can represent a decision or test (e.g., perform a calibration job associated with a particular system parameter associated with a qubit (e.g., qubit 104) to enhance performance of the qubit) that can be made by the calibration agent 116. Depending on the configuration of the decision tree model, each of those branches may lead to another node(s).

With regard to a lookup table, the calibration agent 116 can utilize a lookup table to facilitate determining desirable (e.g., suitable, enhanced, or optimal) calibration jobs or calibration strategies to calibrate the quantum computer 102 and/or other quantum computers, in accordance with the defined calibration management criteria. For instance, the lookup table can comprise calibration-related information, such as respective items of calibration-related information that can be entries in respective locations (e.g., cells) in the lookup table. For example, a first entry can be mapped to a second entry in the lookup table, wherein the first entry can comprise a first subset of system state parameter values associated with a first subset of system state parameters associated with the quantum computer 102 and the second entry can comprise an action (e.g., perform a first calibration job to calibrate a first parameter associated with the quantum computer 102) to be performed by the calibration agent 116 if the first subset of system state parameter values associated with the first subset of system state parameters are identified or detected from an analysis of the system state parameters. The calibration agent 116 can update the decision tree (e.g., update the nodes and/or the structure of the nodes and branches in relation to each other) and/or the lookup table (e.g., update the entries in the cells of the lookup table and/or the mapping between entries in the lookup table) based on results of calibration jobs or strategies performed by the calibration agent 116 and/or feedback information received from a user, wherein the feedback information can relate to calibration jobs or strategies associated with calibration of the quantum computer 102 and/or other quantum computers, and/or performance of the quantum computer 102 and/or other quantum computers.

With further regard to the system 100 of FIG. 1, in accordance with various embodiments, the CMC 110 can comprise (as depicted) or be associated with a processor component 118 that can work in conjunction with the other components (e.g., monitoring job component 112, modeler component 114, calibration agent 116, data store 120, or other component) to facilitate performing the various functions of the CMC 110. The processor component 118 can employ one or more processors, microprocessors, or controllers that can process data, such as information relating to circuits (e.g., quantum circuitry), qubits, quantum components or devices, system parameters, system state parameters, calibration processes, calibration jobs, calibration strategies, actions, estimation processes, functions (e.g., reward-related functions or other functions), algorithms (e.g., algorithms as indicated or defined by the processes, protocols, methods, and/or techniques described herein; and/or quantum computing algorithms), quantum logic, defined calibration management criteria, traffic flows, policies, protocols, interfaces, tools, and/or other information, to facilitate operation of the CMC 110, as more fully disclosed herein, and control data flow between the CMC 110 and other components (e.g., quantum computer component 102, quantum programs, data storage devices, user devices or end-point devices, interfaces, or other computing or communication devices) associated with (e.g., connected to) the CMC 110.

The CMC 110 also can comprise or be associated with the data store 120, which can store data structures (e.g., user data, metadata), code structure(s) (e.g., modules, objects, hashes, classes, procedures) or instructions, information relating to circuits (e.g., quantum circuitry), qubits, quantum components or devices, system parameters, system state parameters, calibration processes, calibration jobs, calibration strategies, actions, estimation processes, functions (e.g., reward-related functions or other functions), algorithms (e.g., algorithms as indicated or defined by the processes, protocols, methods, and/or techniques described herein; and/or quantum computing algorithms), quantum logic, defined calibration management criteria, traffic flows, policies, protocols, interfaces, tools, and/or other information, to facilitate controlling operations associated with the CMC 110. In an aspect, the processor component 118 can be functionally coupled (e.g., through a memory bus) to the data store 120 in order to store and retrieve information desired to operate and/or confer functionality, at least in part, to the monitoring job component 112, modeler component 114, calibration agent 116, data store 120, or other component, and/or substantially any other operational aspects of the CMC 110.

In accordance with various embodiments, the CMC 110, including the calibration agent 116, can be utilized to calibrate one or more other quantum computers, such as, for example, quantum computer 122 and/or quantum computer 124, based on the calibration strategies, policies, and/or training of the calibration agent 116 determined or derived from the CMC 110 executing the monitoring jobs, performing system state modeling, determining calibration jobs or calibration strategies, determining policies, performing calibrations on system parameters associated with the quantum computer 102, and/or performing other operations in connection with the quantum computer 102. For instance, the CMC 110 generally can utilize a calibration strategy determined with regard to the quantum computer 102 to calibrate system parameters associated with quantum computer 122 and/or quantum computer 124.

In certain embodiments, the calibration agent 116 can determine or infer a desirable scheduling strategy for scheduling respective calibrations of respective quantum computers (e.g., 102, 122, and/or 124) at respective times to facilitate desirably calibrating the respective quantum computers while maintaining desirable (e.g., suitable, enhanced, or optimal) availability of one or more of the quantum computers, in accordance with the defined calibration management criteria. For instance, the calibration agent 116 can determine or infer a desirable scheduling strategy for scheduling respective calibrations of respective quantum computers (e.g., 102, 122, and/or 124) such that the respective quantum computers each can be desirably calibrated at respective times while ensuring that at least one (or at least a desired number, which can be more than one) of the quantum computers can be available at all times (or at least virtually all of the time) for use (e.g., by users, classical computers, and/or other quantum computers).

Figure 10:
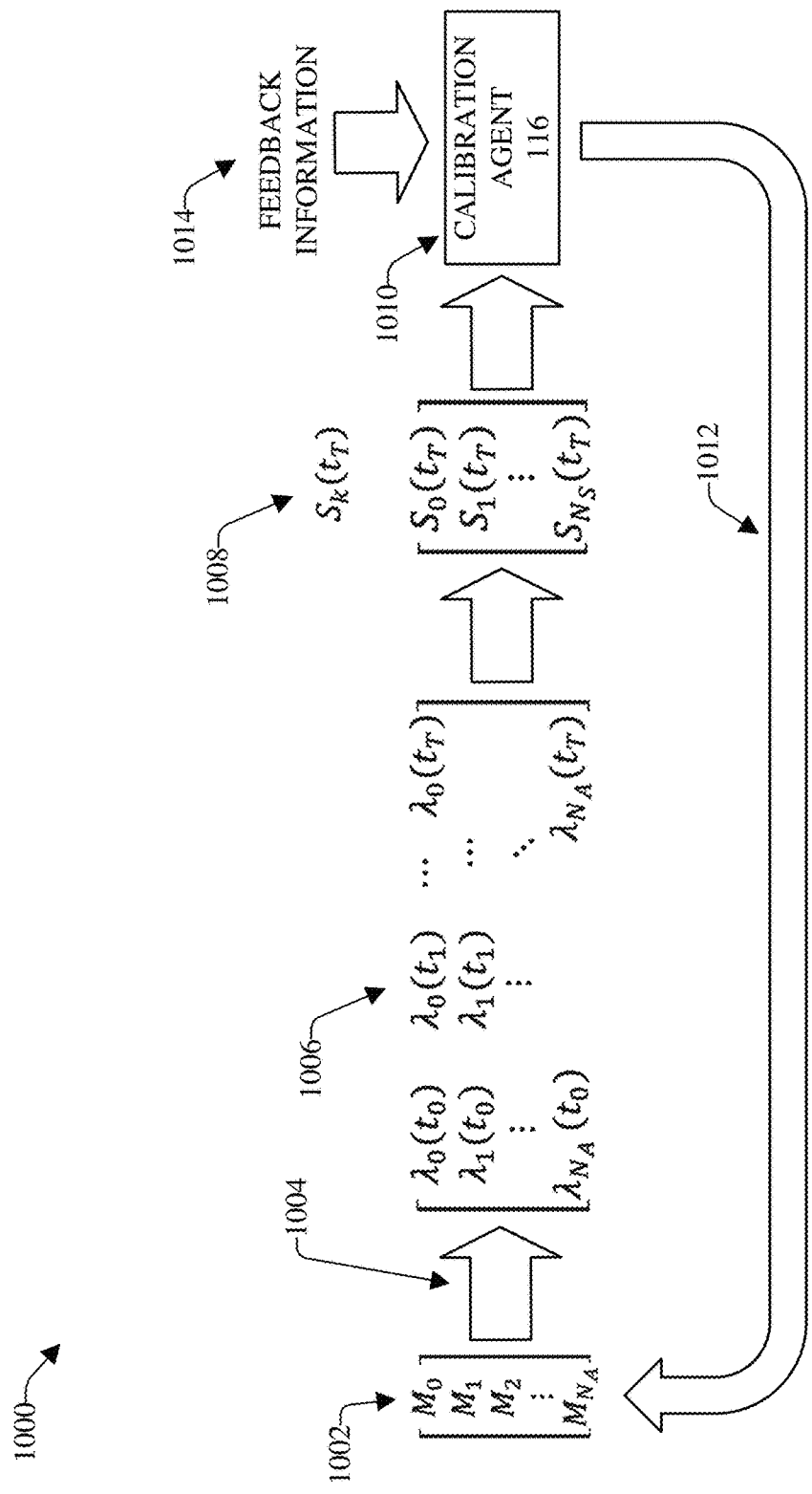
FIG. 10 illustrates a diagram of an example calibration determination process, in accordance with various aspects and embodiments of the disclosed subject matter.

Referring to FIG. 10 (along with FIG. 1), FIG. 10 illustrates a diagram of an example calibration determination process 1000, in accordance with various aspects and embodiments of the disclosed subject matter. In accordance with the example calibration determination process 1000, there can be a monitoring job set 1002, M, comprising a set of $N_A$ monitoring jobs, wherein $M \equiv [M_0, M_1, M_2, \ldots, M_{N_A}]$. The set of monitoring jobs can be a default or static monitoring jobs set, which can be determined, for example, by a user. In some embodiments, the CMC 110 (e.g., the calibration agent 116) can adapt or modify one or more monitoring jobs of the monitoring job set 1002 and/or the order of execution of the monitoring jobs based on the training of the calibration agent 116, such as described herein.

As indicated at reference numeral 1004 of the example calibration determination process 1000, the monitoring job component 112 can execute the monitoring jobs of the monitoring job set 1002 on the quantum computer 102 and can extract system parameters associated with the quantum computer 102 that can be produced based on the execution of the monitoring job set 1002, such as described herein. As indicated at reference numeral 1006 of the calibration determination process 1000, the monitoring job component 112 can create (or reset or update) a parameter buffer, P, comprising the set of system parameters (e.g., parameter values of the system parameters for the desired number of time instances, $N_T$) that can be produced based on (e.g., in response to) the execution of the set of $N_A$ monitoring jobs on the quantum computer 102 over the desired number of time instances, $N_T$, such as described herein.

The modeler component 114 can utilize the set of system parameters (e.g., the system parameter buffer, P) as data input to perform system state modeling of the system state of the quantum computer 102. As indicated at reference numeral 1008 of the example calibration determination process 1000, the modeler component 114 can analyze and perform system state modeling on the set of system parameters to produce a representation of the system state (e.g., $\chi(P) = S_k(t_T)$) based on the desired modeling function ($\chi$) or process (e.g., SPC function or process; stochastic process function or process; or other desired modeling function or process), such as described herein. For instance, based on such analysis and system state modeling, the modeler component 114 can determine and/or produce the set system state parameters, $S_k(t_T)$, comprising respective system state parameters (e.g., system state parameter values) at time $t_T$. In some embodiments, the system state parameter values of the system state can be arranged or structured in the form of a matrix (e.g., system state parameter matrix) that can comprise the number $N_S$ of system state parameters (e.g., $S_k(t_T) \equiv [S_0(t_T), S_1(t_T), S_2(t_T), \ldots, S_{N_S}(t_T)]$).

As indicated at reference numeral 1010 of the example calibration determination process 1000, the set of system state parameters, $S_k(t_T)$, associated with the quantum computer 102 can be input to the calibration agent 116, and the calibration agent 116 can analyze the set of system state parameters associated with the quantum computer 102 and the policy, $\pi$, relating to calibrations, and, based on the results of such analysis, the calibration agent 116 can determine an action, $\alpha(t_T)$, to perform to desirably (e.g., suitably, enhancedly, or optimally) calibrate (e.g., update or change) one or more system parameters associated with the quantum computer 102 (e.g., $\pi(S_k(t_T)) = \alpha(t_T)$) to enhance the performance of the quantum computer 102, in accordance with the defined calibration management criteria, such as described herein. The action can comprise a calibration job(s), a calibration strategy, or a determination that no calibration job is to be performed with respect to the quantum computer 102. As indicated at reference numeral 1012 of the example calibration determination process 1000, the calibration agent 116 can execute the calibration job(s) or calibration strategy, C, determine the reward, R, and/or update the policy, $\pi$, such as more fully described herein.

At this point, the example calibration determination process 1000 can proceed back to reference numeral 1002 to begin the process 1000 over again with the monitoring job set 1002, which can be the same monitoring job set or a different monitoring job set. As disclosed, in some embodiments, the CMC 110 (e.g., the calibration agent 116) can adapt or modify one or more monitoring jobs of the monitoring job set 1002 and/or the order of execution of the monitoring jobs based on the training of the calibration agent 116 (e.g., based on the policy), such as described herein. For instance, based on the training of the calibration agent 116, the calibration agent 116 can determine that a particular monitoring job, or an order of executing monitoring jobs, is not sufficiently useful in determining or exposing whether there is an issue (e.g., a problem, such as undesirable (e.g., unacceptable, decreased, or suboptimal) performance, inaccuracy, or loss of acceptable calibration) associated with a system parameter associated with the quantum computer 102. Also, based on the training of the calibration agent 116, the calibration agent 116 can determine a different monitoring job, or a different order of executing monitoring jobs, that can be more and sufficiently useful in determining or exposing whether there is an issue associated with a system parameter associated with the quantum computer 102 and/or whether a calibration job or calibration strategy relating to calibration of the system parameter can enhance performance of the system parameter and/or the quantum computer 102. As another example, the calibration agent 116 (e.g., as part on an action item of the determined action(s)) can determine that a particular monitoring job(s) is to be removed from the monitoring job set, and this modified monitoring job set is to be run on the quantum computer 102 to facilitate determining what difference, if any, there is in the system parameter values, the system state parameter values, the calibration job(s) determined by the calibration agent 116, the calibration strategy determined by the calibration agent 116, or other action determined, based on the modified monitoring job set (e.g., the modification of the monitoring job set to remove the particular monitoring job(s)).

In certain embodiments, in addition to feedback information (e.g., information relating to the calibration strategy, policy (e.g., updated policy), or reward (e.g., updated reward)) that the CMC 110 (e.g., calibration agent 116) can receive from the system 100 (e.g., from the AI component 208 or other component of the calibration agent 116), the CMC 110 can receive feedback information relating to calibration of the quantum computer 102 (as indicated at reference numeral 1014) from a user via a communication device or interface. The communication device can be, for example, a computer, a mobile phone (e.g., a smart phone), an electronic pad or tablet, or other type of communication device. The feedback information can comprise positive feedback information that can indicate an action or operation performed by the calibration agent 116 was beneficial to and/or enhanced performance of a system parameter associated with the quantum computer 102 and/or overall performance of the quantum computer 102. The feedback information also can comprise negative feedback information that can indicate a particular action or operation performed by the calibration agent 116 was not beneficial (e.g., was detrimental or harmful) to and/or decreased (e.g., negatively impacted) performance of a system parameter associated with the quantum computer 102 and/or the overall performance of the quantum computer 102. The feedback information also can relate to manual calibrations of parameters and/or the results of manual calibrations of parameters performed by a user.

As an example of feedback information of a user, the feedback information can indicate whether performing a particular calibration job or strategy with regard to a system parameter was determined (e.g., by the user, another entity, or another device, such as a classical computer or another quantum computer) to be sufficiently beneficial or not (e.g., sufficiently improved or increased performance of the system parameter and/or quantum computer 102 or not). The feedback information also can indicate whether a particular monitoring job was determined to be sufficiently useful or not. The feedback information can indicate whether a particular system state modeling process (e.g., SPC, stochastic process modeling, or direct system state modeling) utilized during a previous iteration of the calibration determination process 1000 was determined to be as beneficial or useful as another type of system state modeling process was or is anticipated to be. The feedback information also can indicate whether there should be a change made to the performance of monitoring jobs, system state modeling, calibration strategy determinations, calibration strategy execution, or other aspects of calibration determination process 1000. The calibration agent 116 (including the AI component 908) can incorporate the feedback information into the analysis (e.g., AI or ML analysis) such that the calibration agent 116 can analyze the information relating to the calibration determination process 1000 (e.g., the last iteration and/or other previous (e.g., historical) iterations of the calibration determination process 1000) and the feedback information to facilitate determining whether to update (e.g., modify, adapt, or change), and, if so, updating, the monitoring job set, execution of monitoring jobs, performance of system state modeling, performance of calibration strategy determinations, execution of a calibration strategy, or other aspects of calibration determination process 1000.

Figure 11:
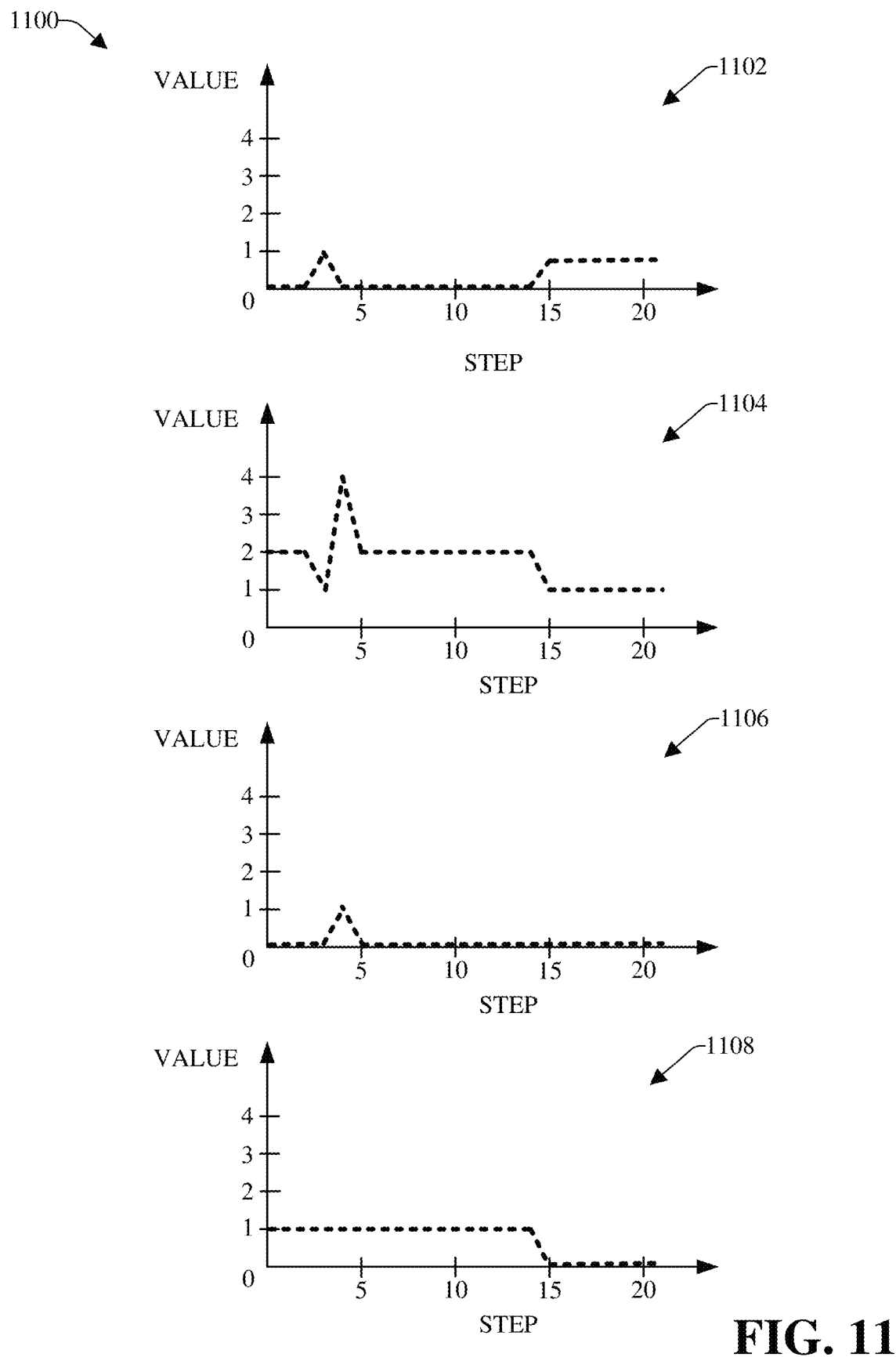
FIG. 11 presents a diagram of example graphs of simulation results of a simulation relating to a qubit of a quantum computer, in accordance with various aspects and embodiments of the disclosed subject matter.

As described herein, the calibration agent 116 can be trained to desirably (e.g., suitably, enhancedly, or optimally) determine calibration jobs and calibration strategies that can be performed to calibrate the quantum computer 102 and/or other quantum computers, based on the results of analyzing (e.g., performing a data analysis and/or AI or ML analysis of) system state parameters associated with the quantum computer and/or other desired information, in accordance with the policy (and corresponding calibration management criteria). Referring briefly to FIG. 11, FIG. 11 presents a diagram of example graphs 1100 of simulation results of a simulation relating to a qubit of a quantum computer, in accordance with various aspects and embodiments of the disclosed subject matter. To test the use of a calibration agent (e.g., reinforcement learning agent) for calibration, a simulation for a qubit of a quantum computer was performed, wherein there was a simulation of an error per Clifford (epc) and $T_1$ for a qubit that take on discrete values that could be the result of processing by SPC, stochastic process modeling, or another desired intermediate representation of the parameter buffer of system parameters associated with the quantum computer (e.g., the qubit of the quantum computer). The epc can be an error value associated with a Clifford gate of a group of Clifford gates associated with a group of qubits. Results of the simulation are presented in the example graphs 1100, comprising a graph 1102 of the epc, over time (e.g., epc value for each time step), a graph 1104 of the reward over time (e.g., reward value for each time step), a graph 1106 of the action over time (e.g., action value for each time step), and a graph 1108 of $T_1$ over time (e.g., the $T_1$ value for each time step).

In the simulation, the calibration agent can observe both $T_1$ and epc and can have two available actions: calibrate (e.g., a 1 value) the system parameter or leave the system (e.g., quantum computer) alone (e.g., a 0 value). A goal of the calibration agent can be to keep epc at 0, which can indicate that the gate of the qubit is desirably (e.g., well, suitably, sufficiently, or optimally) calibrated, while avoiding unnecessary calibrations of the qubit. In this simulation, a quantum computing system is being modeled that has an epc which can go to a 1 value for two reasons: (1) two-level systems (TLSs) can cause $T_1$ to drop by a significant amount (e.g., decrease by at least a defined amount), or (2) the calibration of the qubit gate can reach a defined level of unacceptable performance of the qubit gate. In case (1), performing a calibration (action 1) will not fix (e.g., rectify or correct) the epc, however, in case (2), performing a calibration of a system parameter of the qubit relating to the qubit gate can fix the epc. Without a penalty for performing a calibration on the parameter of the qubit, the optimal policy for keeping epc low would be to calibrate the parameter of the qubit at every time step. However, in accordance with the defined calibration management criteria, the calibration agent desirably can include a penalty in the performance reward function, $R_P$, each time a calibration is performed by the calibration agent. The example graphs 1100 (e.g., the example plots) show how the calibration agent performs after being trained on approximately 2000 iterations. In the example graphs 1100, it can be observed that the calibration agent learns to only calibrate the system parameter associated with the qubit when the $T_1$ is high (e.g., a 1 value) and the epc is low (e.g., a 0 value), which can be a desirable (e.g., suitable, enhanced, or optimal) policy for maintaining performance of the qubit and quantum computer, while reducing (e.g., minimizing) the number of calibrations performed on the qubit or quantum computer.

In some embodiments, corresponding to the above simulation where the calibration agent learned a desirable policy relating to determining whether to, and when, to calibrate the system parameter associated with the qubit, the calibration agent 116 (e.g., trained calibration agent) can determine or utilize the following example code or pseudocode that can correspond to such desirable policy:

```
action_bonus = 0.0
# if self._active_channels[0] = = 1:
if action = = 0: # do not calibrate
    action_bonus += 1
elif action = = 1: # calibrate
    self.epc_issue = 0
# get the new values (perform the action on the system)
self.get_new_vals (action)
# reward based on the change in epc
if action = = 1:
    action_bonus -= 3*(self.epc-old_epc)
reward = action_bonus + (1-self.epc).
```

The systems and/or devices have been (or will be) described herein with respect to interaction between several components. It should be appreciated that such systems and components can include those components or sub-components specified therein, some of the specified components or sub-components, and/or additional components. Sub-components could also be implemented as components communicatively coupled to other components rather than included within parent components. Further yet, one or more components and/or sub-components may be combined into a single component providing aggregate functionality. The components may also interact with one or more other components not specifically described herein for the sake of brevity, but known by those of skill in the art.

Figure 12:
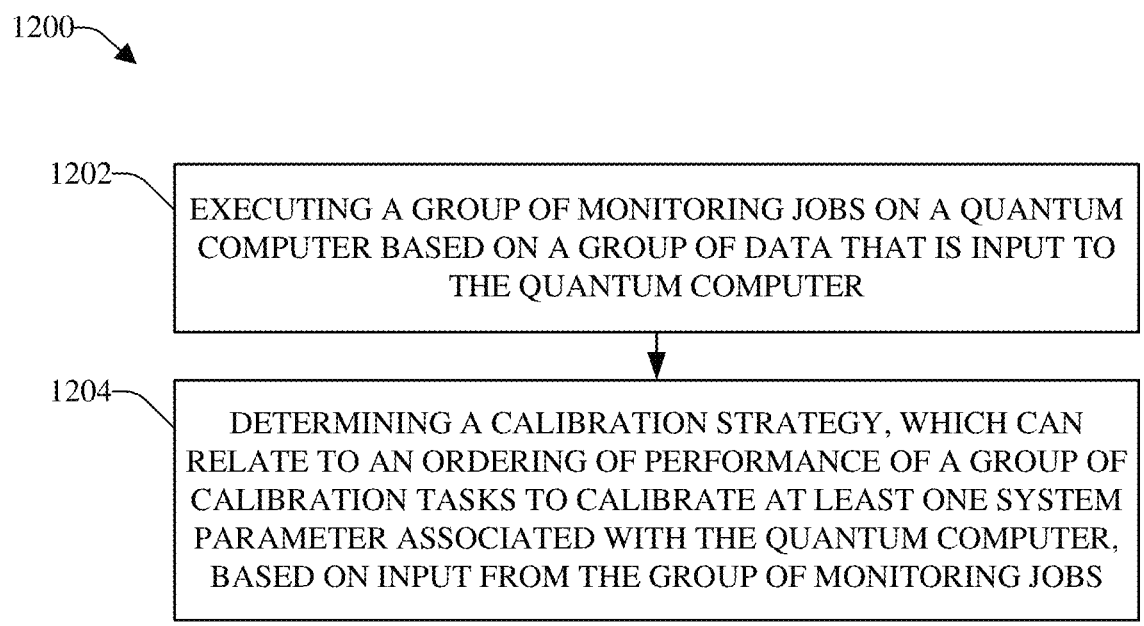
FIG. 12 illustrates a flow diagram of an example, non-limiting method that can determine a desirable calibration strategy for calibrating and enhancing performance of a quantum computer, in accordance with various aspects and embodiments of the disclosed subject matter.

FIG. 12 illustrates a flow diagram of an example, non-limiting method 1200 that can determine a desirable calibration strategy for calibrating and enhancing performance of a quantum computer, in accordance with various aspects and embodiments of the disclosed subject matter. In some embodiments, the method 1200 can be performed by, for example, the CMC and/or a processor component, which can be associated with a data store. Repetitive description of like elements employed in other embodiments described herein is or may be omitted for sake of brevity.

At 1202, a group of monitoring jobs can be executed on a quantum computer based on a group of data that is input to the quantum computer. The CMC can input data relating to monitoring jobs to the quantum computer, and can execute the group of monitoring jobs on the quantum computer based on the data.

At 1204, a calibration strategy, which can relate to an ordering of performance of a group of calibration tasks to calibrate at least one system parameter associated with the quantum computer, can be determined based on input from the group of monitoring jobs, or based on a group of system state parameters that can be determined from the group of system parameter values. The CMC, employing the calibration agent, can determine the calibration strategy based on the input from the group of monitoring jobs. In some embodiments, the input from the group of monitoring jobs can comprise a group of system parameter values that can be determined from output data generated by the quantum computer in response to the execution of the group of monitoring jobs, or can comprise a group of system state parameters that can be determined from (e.g., based on) the group of system parameter values. The calibration strategy can relate to an ordering of performance of a group of calibration tasks (e.g., jobs) to calibrate a group of system parameters, comprising one or more system parameters, associated with the quantum computer (e.g., system parameters associated with a qubit(s) or other quantum components or circuitry of the quantum computer), and/or a scheduling of the calibration of the one or more system parameters associated with the quantum computer.

Figure 13:
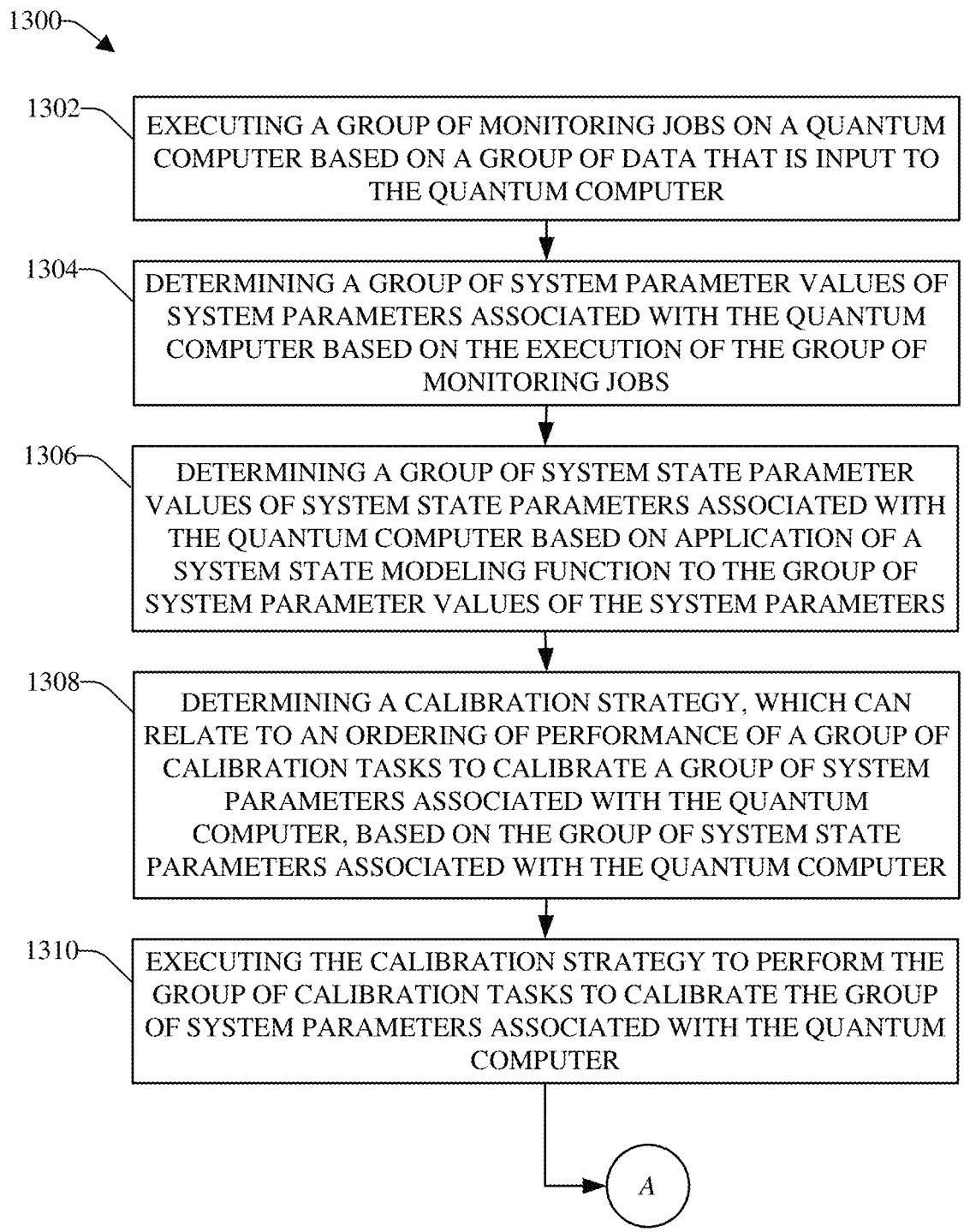
FIGS. 13 and 14 depict a flow diagram of another example, non-limiting method that can determine and execute a desirable calibration strategy for calibrating and enhancing performance of a quantum computer, in accordance with various aspects and embodiments of the disclosed subject matter.
Figure 14:
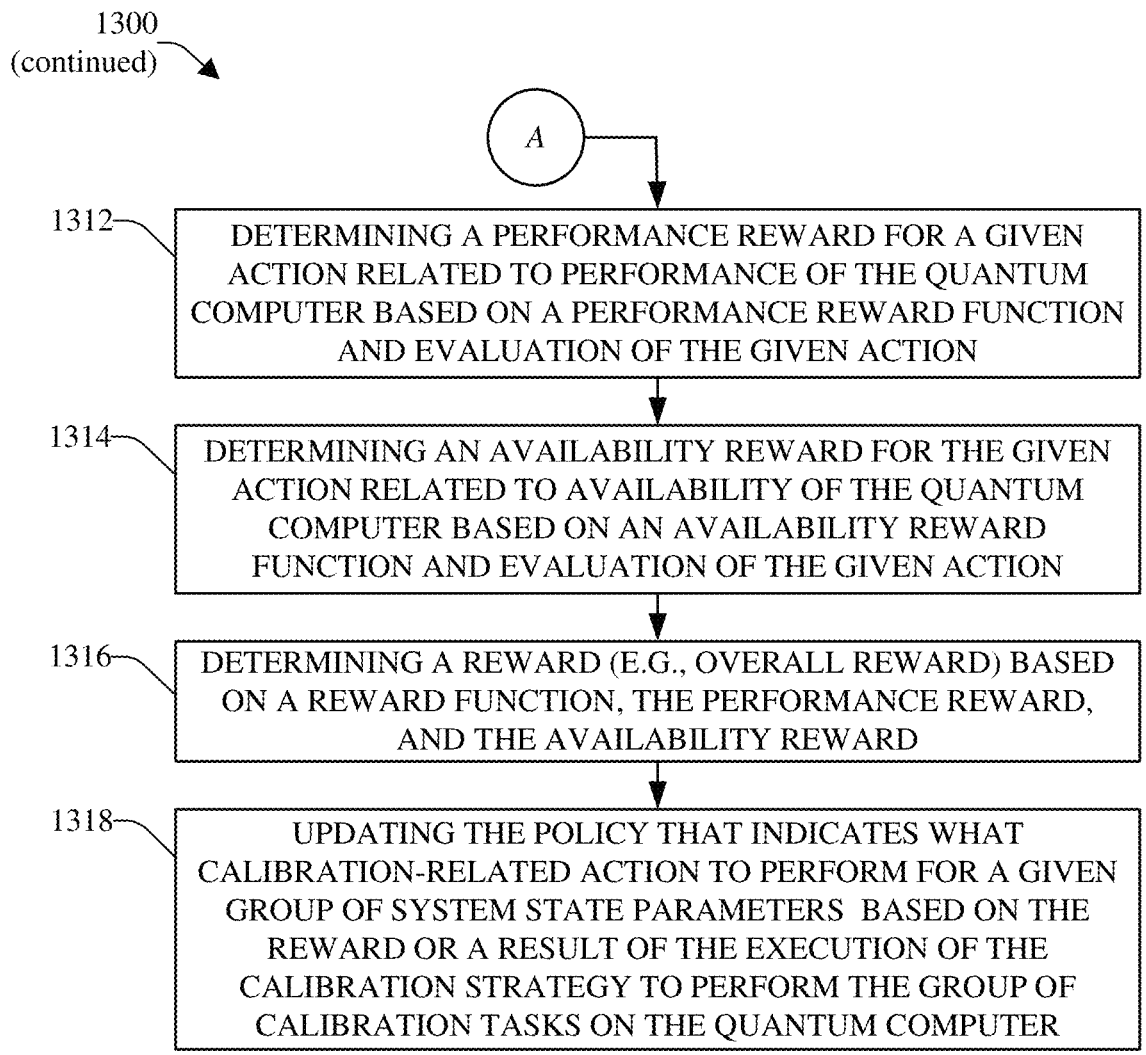

FIGS. 13 and 14 depict a flow diagram of another example, non-limiting method 1300 that can determine and execute a desirable calibration strategy for calibrating and enhancing performance of a quantum computer, in accordance with various aspects and embodiments of the disclosed subject matter. The method 1300 can be performed by, for example, the CMC and/or a processor component, which can be associated with a data store. Repetitive description of like elements employed in other embodiments described herein is or may be omitted for sake of brevity.

At 1302, a group of monitoring jobs can be executed on a quantum computer based on a group of data that is input to the quantum computer. The CMC can input data relating to monitoring jobs to the quantum computer, and can execute the group of monitoring jobs on the quantum computer based on the data.

At 1304, a group of system parameter values of system parameters associated with the quantum computer can be determined based on the execution of the group of monitoring jobs. The CMC can determine or produce the group of system parameter values of the system parameters based on (e.g., in response to) the execution of the group of monitoring jobs on the quantum computer, such as described herein.

At 1306, a group of system state parameter values of system state parameters associated with the quantum computer can be determined based on application of a system state modeling function to the group of system parameter values of the system parameters. The CMC can determine or produce the group of system state parameter values of the system state parameters based on (e.g., in response to) the application of the system state modeling function (e.g., SPC function, stochastic process modeling function, trivial system state modeling function, or other desired system state modeling function) to the group of system parameter values of the system parameters, such as described herein.

At 1308, a calibration strategy, which can relate to an ordering of performance of a group of calibration tasks to calibrate a group of system parameters associated with the quantum computer, can be determined based on the group of system state parameters associated with the quantum computer. The calibration agent can determine the calibration strategy based on the group of system state parameters, such as described herein. The calibration strategy can relate to an ordering of performance of a group of calibration tasks (e.g., jobs) to calibrate a group of system parameters, comprising one or more system parameters, associated with the quantum computer (e.g., system parameters associated with a qubit(s) or other quantum components or circuitry of the quantum computer), and/or a scheduling of the calibration of the one or more system parameters associated with the quantum computer. It is to be appreciated and understood that, in some instances, the calibration strategy can be to have the calibration agent perform a specific calibration job (e.g., parameter enhancement job) for a specific parameter (e.g., on a particular qubit or other quantum component of the quantum computer). In other instances, the calibration strategy can be to not have any calibration job performed at that time.

At 1310, the calibration strategy can be executed to perform the group of calibration tasks to calibrate the group of system parameters associated with the quantum computer. The calibration agent can execute the calibration strategy to perform or facilitate performing the group of calibration tasks to calibrate the group of system parameters associated with the quantum computer (e.g., one or more qubits, one or more other quantum components, or other quantum circuitry of the quantum computer). At this point, the method 1300 can proceed to reference point A, wherein the method 1300 can continue from reference point A, as shown in FIG. 14 and described herein.

At 1312, a performance reward for a given action related to performance of the quantum computer can be determined based on a performance reward function and evaluation of the given action. The calibration agent can determine the performance reward (e.g., performance reward value) for the given action related to performance of the quantum computer (e.g., a calibration job or strategy) based on the performance reward function and the evaluation of the given action (e.g., application of the performance reward function to the given action as part of the evaluation of the given action), wherein the evaluation of the given action can include the performance of the quantum computer in response to performing the given action (e.g., relative performance of the quantum computer as compared to performance of the quantum computer prior to the given action being performed). The performance of the quantum computer can be evaluated based on a number of factors, including fidelity (e.g., fidelity of the qubits, including qubit gates), quantum volume associated with the quantum computer, or other factors or characteristics relating to performance of the quantum computer.

At 1314, an availability reward for the given action related to availability of the quantum computer can be determined based on an availability reward function and evaluation of the given action. The calibration agent can determine the availability reward (e.g., availability reward value) for the given action related to availability of the quantum computer based on the availability reward function and the evaluation of the given action (e.g., application of the availability reward function to the given action as part of the evaluation of the given action). The availability reward function can take into account the amount of downtime (e.g., unavailability) of the quantum computer due to the time utilized to perform the given action, and, typically, there can be a higher availability reward associated with (e.g., given for) higher availability of the quantum computer for use to perform quantum computing operations and computations.

At 1316, a reward (e.g., overall reward) can be determined based on a reward function, the performance reward, and the availability reward. The calibration agent can determine the reward (e.g., overall reward) based on (e.g., as a function of) the reward function, the performance reward, and the availability reward (e.g., application of the reward function to the performance reward and the availability reward). In some embodiments, the calibration agent can apply respective (e.g., different) weights (e.g., weighting values) to the performance reward and the availability reward to weight or place more significance on one of them over the other. In other embodiments, the performance reward and the availability reward can be equally weighted in relation to each other.

At 1318, the policy that indicates what calibration-related action to perform for a given group of system state parameters can be updated based on the reward or a result of the execution of the calibration strategy to perform the group of calibration tasks on the quantum computer. The calibration agent can update the policy based on the reward or the result of the execution of the calibration strategy. In some embodiments, the updating of the policy, which can be utilized by the calibration agent to what calibration-related action to perform for a given group of system state parameters, can be part of the training of the calibration agent.

For simplicity of explanation, the methods and/or computer-implemented methods are depicted and described as a series of acts. It is to be understood and appreciated that the disclosed subject matter is not limited by the acts illustrated and/or by the order of acts, for example acts can occur in various orders and/or concurrently, and with other acts not presented and described herein. Furthermore, not all illustrated acts can be required to implement the computer-implemented methods in accordance with the disclosed subject matter. In addition, those skilled in the art will understand and appreciate that the computer-implemented methods could alternatively be represented as a series of interrelated states via a state diagram or events. Additionally, it should be further appreciated that the computer-implemented methods disclosed hereinafter and throughout this specification are capable of being stored on an article of manufacture to facilitate transporting and transferring such computer-implemented methods to computers. The term article of manufacture, as used herein, is intended to encompass a computer program accessible from any computer-readable device or storage media.

Figure 15:
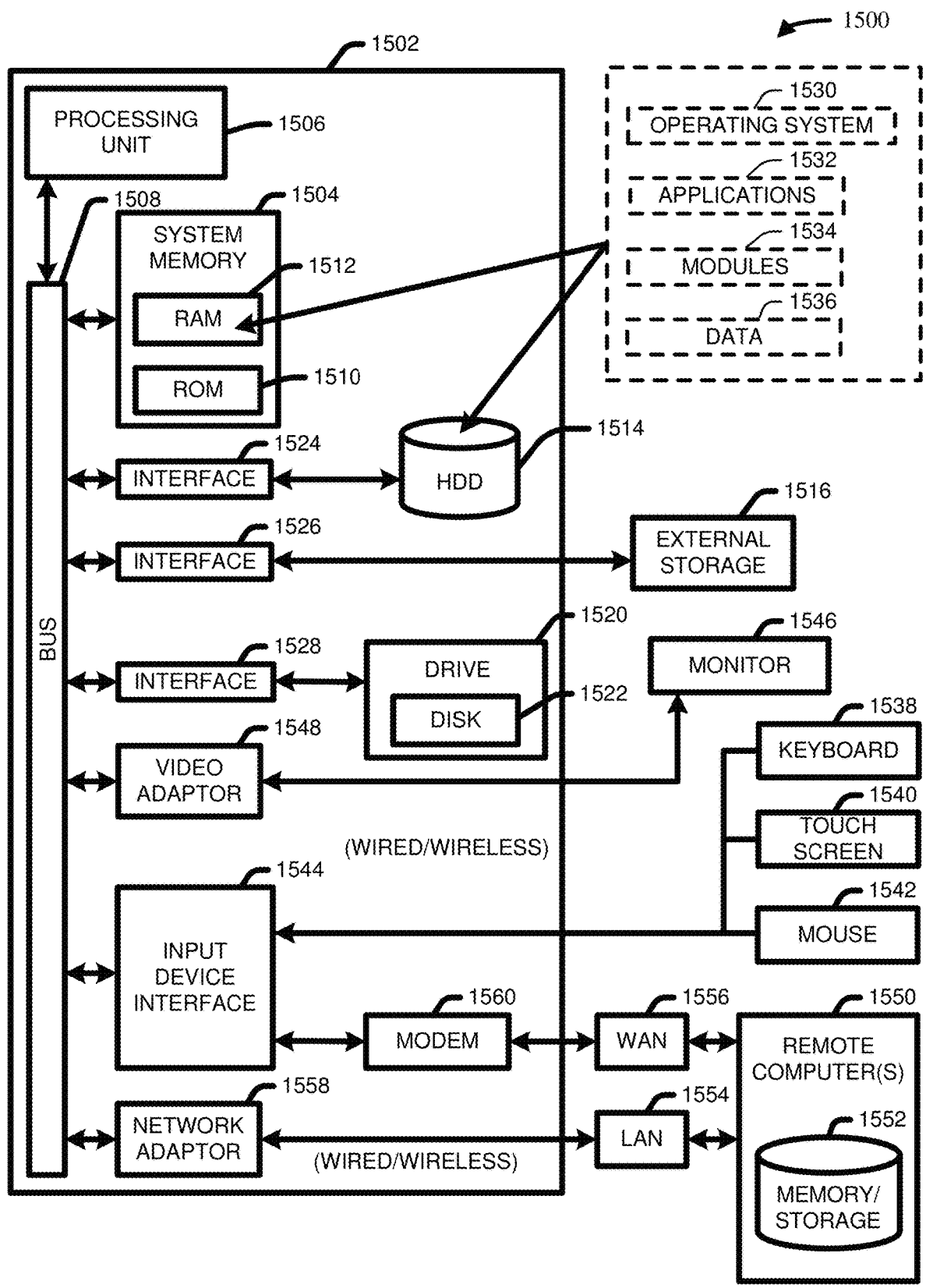
FIG. 15 illustrates a block diagram of an example, non-limiting operating environment in which one or more embodiments described herein can be facilitated.
Figure 16:
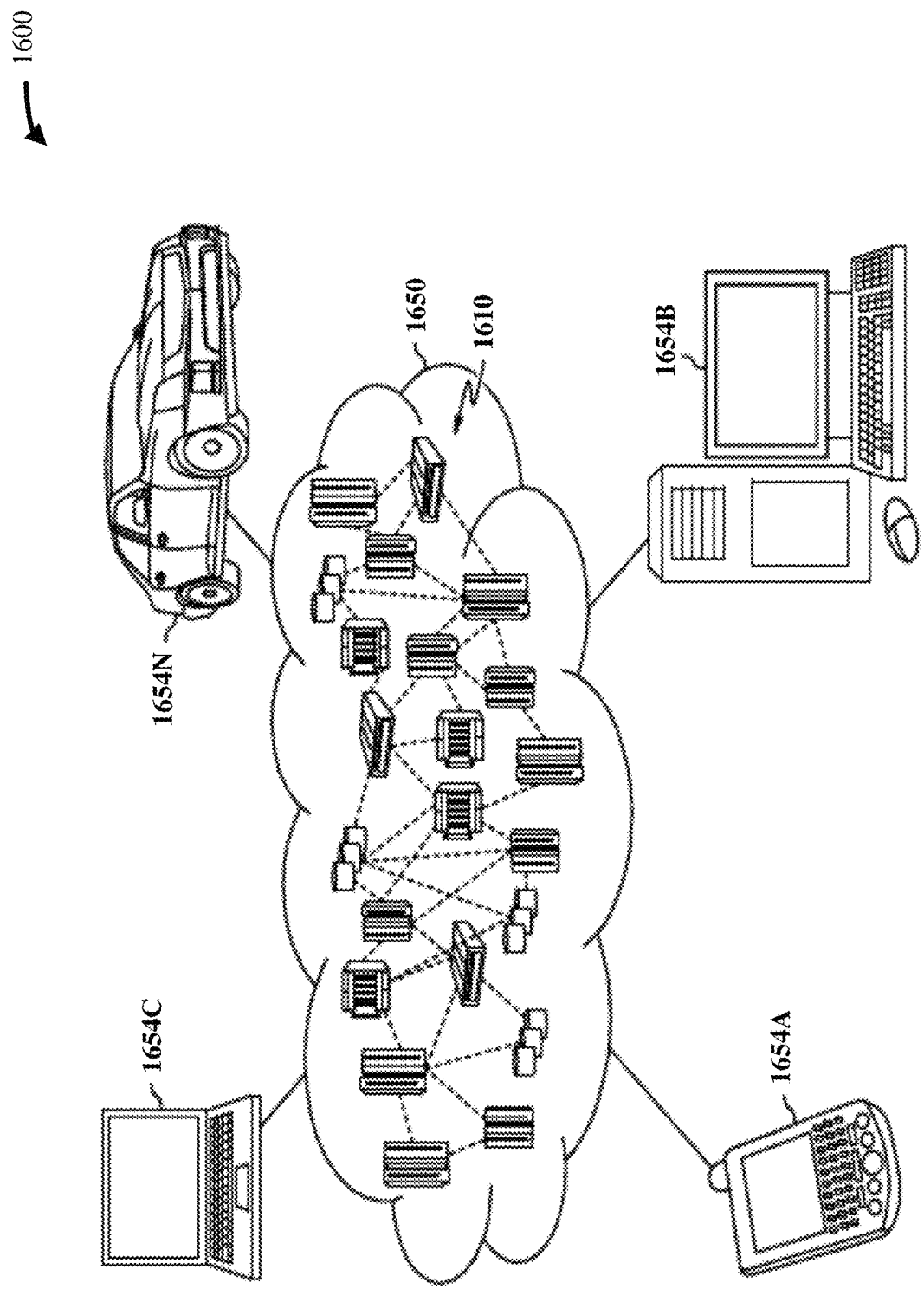
FIG. 16 depicts a block diagram of an example, non-limiting, cloud computing environment in accordance with one or more embodiments described herein.
Figure 17:
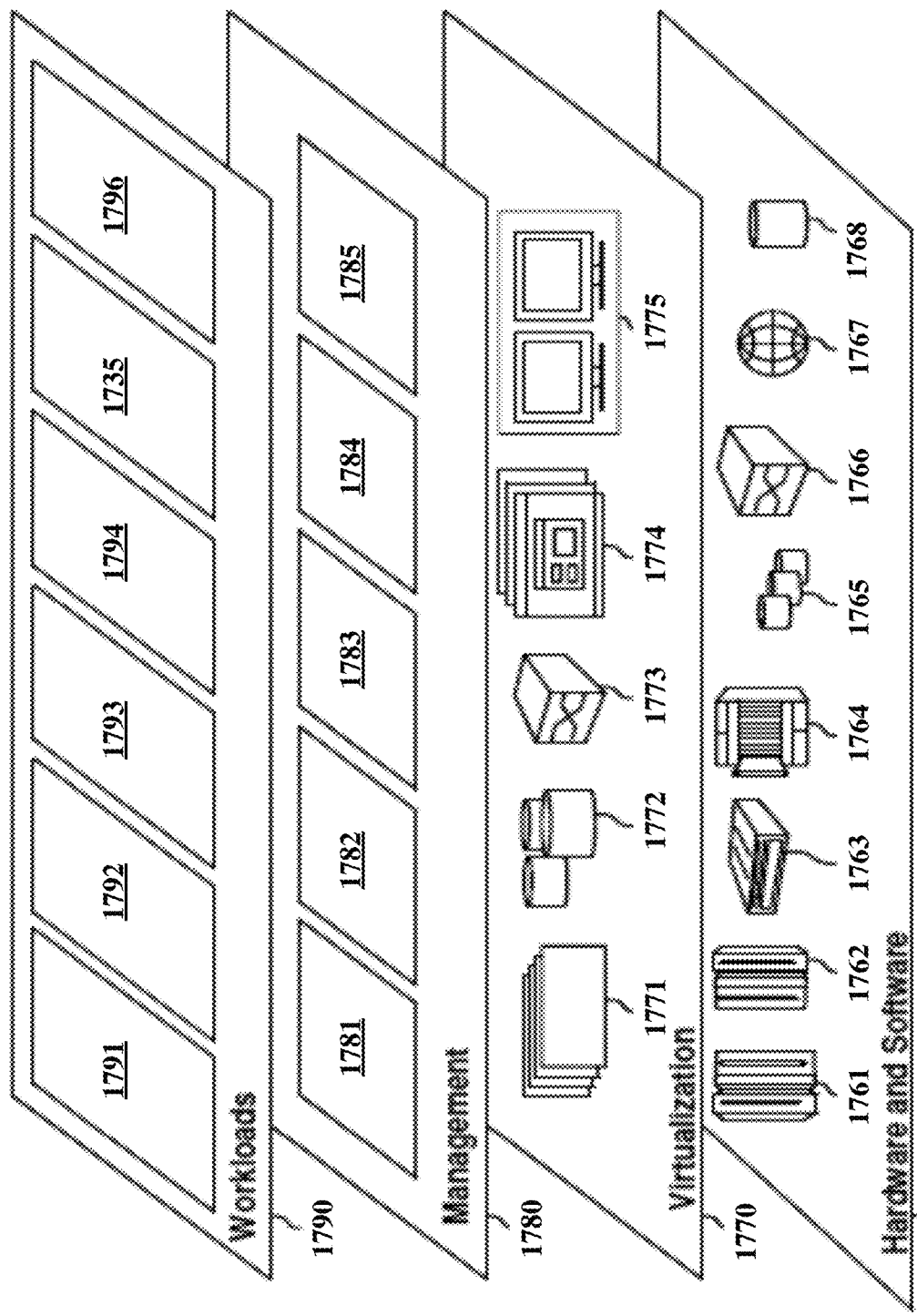
FIG. 17 illustrates a block diagram of example, non-limiting, abstraction model layers in accordance with one or more embodiments described herein.

Turning next to FIGS. 15-17, a detailed description is provided of additional context for the one or more embodiments described herein at FIGS. 1-14. FIG. 15 and the following discussion are intended to provide a general description of a suitable operating environment 1500 in which one or more embodiments described herein at FIGS. 1-14 can be implemented. For example, one or more components and/or other aspects of embodiments described herein can be implemented in or be associated with, such as accessible via, the operating environment 1500. Further, while one or more embodiments have been described above in the general context of computer-executable instructions that can run on one or more computers, those skilled in the art will recognize that one or more embodiments also can be implemented in combination with other program modules and/or as a combination of hardware and software.

Generally, program modules include routines, programs, components, data structures and/or the like, that perform particular tasks and/or implement particular abstract data types. Moreover, the aforedescribed methods can be practiced with other computer system configurations, including single-processor or multiprocessor computer systems, mini-computers, mainframe computers, Internet of Things (IoT) devices, distributed computing systems, as well as computers, hand-held computing devices, microprocessor-based or programmable consumer electronics, and/or the like, each of which can be operatively coupled to one or more associated devices.

Computing devices typically include a variety of media, which can include computer-readable storage media, machine-readable storage media and/or communications media, which two terms are used herein differently from one another as follows. Computer-readable storage media or machine-readable storage media can be any available storage media that can be accessed by the computer and includes both volatile and nonvolatile media, removable and non-removable media. By way of example, but not limitation, computer-readable storage media and/or machine-readable storage media can be implemented in connection with any method or technology for storage of information such as computer-readable and/or machine-readable instructions, program modules, structured data and/or unstructured data.

Computer-readable storage media can include, but are not limited to, random access memory (RAM), read only memory (ROM), electrically erasable programmable read only memory (EEPROM), flash memory or other memory technology, compact disk read only memory (CD ROM), digital versatile disk (DVD), Blu-ray disc (BD) and/or other optical disk storage, magnetic cassettes, magnetic tape, magnetic disk storage and/or other magnetic storage devices, solid state drives or other solid state storage devices and/or other tangible and/or non-transitory media which can be used to store specified information. In this regard, the terms "tangible" or "non-transitory" herein as applied to storage, memory and/or computer-readable media, are to be understood to exclude only propagating transitory signals per se as modifiers and do not relinquish rights to all standard storage, memory and/or computer-readable media that are not only propagating transitory signals per se. Computer-readable storage media can be accessed by one or more local or remote computing devices, e.g., via access requests, queries and/or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set and/or changed in such a manner as to encode information in one or more signals. By way of example, but not limitation, communication media can include wired media, such as a wired network, direct-wired connection and/or wireless media such as acoustic, RF, infrared and/or other wireless media.

With reference still to FIG. 15, the example operating environment 1500 for implementing one or more embodiments of the aspects described herein can include a computer 1502, the computer 1502 including a processing unit 1506, a system memory 1504 and/or a system bus 1508. One or more aspects of the processing unit 1506 can be applied to processors, such as processor component 118 of the non-limiting system 100. The processing unit 1506 can be implemented in combination with and/or alternatively to processors such as processor component 118.

Memory 1504 can store one or more computer and/or machine readable, writable and/or executable components and/or instructions that, when executed by processing unit 1506 (e.g., a classical processor, a quantum processor and/or like processor), can facilitate performance of operations defined by the executable component(s) and/or instruction (s). For example, memory 1504 can store computer and/or machine readable, writable and/or executable components and/or instructions that, when executed by processing unit 1506, can facilitate execution of the one or more functions described herein relating to non-limiting system 100, as described herein with or without reference to the one or more figures of the one or more embodiments.

Memory 1504 can comprise volatile memory (e.g., random access memory (RAM), static RAM (SRAM), dynamic RAM (DRAM) and/or the like) and/or non-volatile memory (e.g., read only memory (ROM), programmable ROM (PROM), electrically programmable ROM (EPROM), electrically erasable programmable ROM (EEPROM) and/or the like) that can employ one or more memory architectures.

Processing unit 1506 can comprise one or more types of processors and/or electronic circuitry (e.g., a classical processor, a quantum processor and/or like processor) that can implement one or more computer and/or machine readable, writable and/or executable components and/or instructions that can be stored at memory 1504. For example, processing unit 1506 can perform one or more operations that can be specified by computer and/or machine readable, writable and/or executable components and/or instructions including, but not limited to, logic, control, input/output (I/O), arithmetic and/or the like. In one or more embodiments, processing unit 1506 can be any of one or more commercially available processors. In one or more embodiments, processing unit 1506 can comprise one or more central processing unit, multi-core processor, microprocessor, dual microprocessors, microcontroller, System on a Chip (SOC), array processor, vector processor, quantum processor and/or another type of processor. The examples of processing unit 1506 can be employed to implement one or more embodiments described herein.

The system bus 1508 can couple system components including, but not limited to, the system memory 1504 to the processing unit 1506. The system bus 1508 can comprise one or more types of bus structure that can further interconnect to a memory bus (with or without a memory controller), a peripheral bus and/or a local bus using one or more of a variety of commercially available bus architectures. The system memory 1504 can include ROM 1510 and/or RAM 1512. A basic input/output system (BIOS) can be stored in a non-volatile memory such as ROM, erasable programmable read only memory (EPROM) and/or EEPROM, which BIOS contains the basic routines that help to transfer information among elements within the computer 1502, such as during startup. The RAM 1512 can include a high-speed RAM, such as static RAM for caching data.

The computer 1502 can include an internal hard disk drive (HDD) 1514 (e.g., EIDE, SATA), one or more external storage devices 1516 (e.g., a magnetic floppy disk drive (FDD), a memory stick or flash drive reader, a memory card reader and/or the like) and/or a drive 1520, e.g., such as a solid state drive or an optical disk drive, which can read or write from a disk 1522, such as a CD-ROM disc, a DVD, a BD and/or the like. Additionally, and/or alternatively, where a solid state drive is involved, disk 1522 could not be included, unless separate. While the internal HDD 1514 is illustrated as located within the computer 1502, the internal HDD 1514 can also be configured for external use in a suitable chassis (not shown). Additionally, while not shown in operating environment 1500, a solid state drive (SSD) can be used in addition to, or in place of, an HDD 1514. The HDD 1514, external storage device(s) 1516 and drive 1520 can be connected to the system bus 1508 by an HDD interface 1524, an external storage interface 1526 and a drive interface 1528, respectively. The HDD interface 1524 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1502, the drives and storage media accommodate the storage of any data in a suitable digital format. Although the description of computer-readable storage media above refers to respective types of storage devices, other types of storage media which are readable by a computer, whether presently existing or developed in the future, can also be used in the example operating environment, and/or that any such storage media can contain computer-executable instructions for performing the methods described herein.

A number of program modules can be stored in the drives and RAM 1512, including an operating system 1530, one or more applications 1532, other program modules 1534 and/or program data 1536. All or portions of the operating system, applications, modules and/or data can also be cached in the RAM 1512. The systems and/or methods described herein can be implemented utilizing one or more commercially available operating systems and/or combinations of operating systems.

Computer 1502 can optionally comprise emulation technologies. For example, a hypervisor (not shown) or other intermediary can emulate a hardware environment for operating system 1530, and the emulated hardware can optionally be different from the hardware illustrated in FIG. 15. In a related embodiment, operating system 1530 can comprise one virtual machine (VM) of multiple VMs hosted at computer 1502. Furthermore, operating system 1530 can provide runtime environments, such as the JAVA runtime environment or the .NET framework, for applications 1532. Runtime environments are consistent execution environments that can allow applications 1532 to run on any operating system that includes the runtime environment. Similarly, operating system 1530 can support containers, and applications 1532 can be in the form of containers, which are lightweight, standalone, executable packages of software that include, e.g., code, runtime, system tools, system libraries and/or settings for an application.

Further, computer 1502 can be enabled with a security module, such as a trusted processing module (TPM). For instance, with a TPM, boot components hash next in time boot components and wait for a match of results to secured values before loading a next boot component. This process can take place at any layer in the code execution stack of computer 1502, e.g., applied at application execution level and/or at operating system (OS) kernel level, thereby enabling security at any level of code execution.

An entity can enter and/or transmit commands and/or information into the computer 1502 through one or more wired/wireless input devices, e.g., a keyboard 1538, a touch screen 1540 and/or a pointing device, such as a mouse 1542. Other input devices (not shown) can include a microphone, an infrared (IR) remote control, a radio frequency (RF) remote control and/or other remote control, a joystick, a virtual reality controller and/or virtual reality headset, a game pad, a stylus pen, an image input device, e.g., camera (s), a gesture sensor input device, a vision movement sensor input device, an emotion or facial detection device, a biometric input device, e.g., fingerprint and/or iris scanner, and/or the like. These and other input devices can be connected to the processing unit 1506 through an input device interface 1544 that can be coupled to the system bus 1508, but can be connected by other interfaces, such as a parallel port, an IEEE 1394 serial port, a game port, a USB port, an IR interface, a BLUETOOTH® interface and/or the like.

A monitor 1546 or other type of display device can be alternatively and/or additionally connected to the system bus 1508 via an interface, such as a video adapter 1548. In addition to the monitor 1546, a computer typically includes other peripheral output devices (not shown), such as speakers, printers and/or the like.

The computer 1502 can operate in a networked environment using logical connections via wired and/or wireless communications to one or more remote computers, such as a remote computer(s) 1550. The remote computer(s) 1550 can be a workstation, a server computer, a router, a desktop computer, portable computer, microprocessor-based entertainment appliance, a peer device and/or other common network node, and typically includes many or all of the elements described relative to the computer 1502, although, for purposes of brevity, only a memory/storage device 1552 is illustrated. Additionally, and/or alternatively, the computer 1502 can be coupled (e.g., communicatively, electrically, operatively, optically and/or the like) to one or more external systems, sources and/or devices (e.g., classical and/or quantum computing devices, communication devices and/or like device) via a data cable (e.g., High-Definition Multimedia Interface (HDMI), recommended standard (RS) 232, Ethernet cable and/or the like).

In one or more embodiments, a network can comprise one or more wired and/or wireless networks, including, but not limited to, a cellular network, a wide area network (WAN) (e.g., the Internet), or a local area network (LAN). For example, one or more embodiments described herein can communicate with one or more external systems, sources and/or devices, for instance, computing devices (and vice versa) using virtually any specified wired or wireless technology, including but not limited to: wireless fidelity (Wi-Fi), global system for mobile communications (GSM), universal mobile telecommunications system (UMTS), worldwide interoperability for microwave access (WiMAX), enhanced general packet radio service (enhanced GPRS), third generation partnership project (3GPP) long term evolution (LTE), third generation partnership project 2 (3GPP2) ultra-mobile broadband (UMB), high speed packet access (HSPA), Zigbee and other 802.XX wireless technologies and/or legacy telecommunication technologies, BLUETOOTH®, Session Initiation Protocol (SIP), ZIGBEE®, RF4CE protocol, WirelessHART protocol, 6LoWPAN (IPv6 over Low power Wireless Area Networks), Z-Wave, an ANT, an ultra-wideband (UWB) standard protocol and/or other proprietary and/or non-proprietary communication protocols. In a related example, one or more embodiments described herein can include hardware (e.g., a central processing unit (CPU), a transceiver, a decoder, quantum hardware, a quantum processor and/or the like), software (e.g., a set of threads, a set of processes, software in execution, quantum pulse schedule, quantum circuit, quantum gates and/or the like) and/or a combination of hardware and/or software that facilitates communicating information among one or more embodiments described herein and external systems, sources and/or devices (e.g., computing devices, communication devices and/or the like).

The logical connections depicted include wired/wireless connectivity to a local area network (LAN) 1554 and/or larger networks, e.g., a wide area network (WAN) 1556. LAN and WAN networking environments can be commonplace in offices and companies and can facilitate enterprise-wide computer networks, such as intranets, all of which can connect to a global communications network, e.g., the Internet.

When used in a LAN networking environment, the computer 1502 can be connected to the local network 1554 through a wired and/or wireless communication network interface or adapter 1558. The adapter 1558 can facilitate wired and/or wireless communication to the LAN 1554, which can also include a wireless access point (AP) disposed thereon for communicating with the adapter 1558 in a wireless mode.

When used in a WAN networking environment, the computer 1502 can include a modem 1560 and/or can be connected to a communications server on the WAN 1556 via other means for establishing communications over the WAN 1556, such as by way of the Internet. The modem 1560, which can be internal and/or external and a wired and/or wireless device, can be connected to the system bus 1508 via the input device interface 1544. In a networked environment, program modules depicted relative to the computer 1502 or portions thereof can be stored in the remote memory/storage device 1552. The network connections shown are merely exemplary and one or more other means of establishing a communications link among the computers can be used.

When used in either a LAN or WAN networking environment, the computer 1502 can access cloud storage systems or other network-based storage systems in addition to, and/or in place of, external storage devices 1516 as described above, such as but not limited to, a network virtual machine providing one or more aspects of storage and/or processing of information. Generally, a connection between the computer 1502 and a cloud storage system can be established over a LAN 1554 or WAN 1556, e.g., by the adapter 1558 or modem 1560, respectively. Upon connecting the computer 1502 to an associated cloud storage system, the external storage interface 1526 can, such as with the aid of the adapter 1558 and/or modem 1560, manage storage provided by the cloud storage system as it would other types of external storage. For instance, the external storage interface 1526 can be configured to provide access to cloud storage sources as if those sources were physically connected to the computer 1502.

The computer 1502 can be operable to communicate with any wireless devices and/or entities operatively disposed in wireless communication, e.g., a printer, scanner, desktop and/or portable computer, portable data assistant, communications satellite, telephone and/or any piece of equipment or location associated with a wirelessly detectable tag (e.g., a kiosk, news stand, store shelf and/or the like). This can include Wireless Fidelity (Wi-Fi) and BLUETOOTH® wireless technologies. Thus, the communication can be a predefined structure as with a conventional network or simply an ad hoc communication between at least two devices.

The illustrated embodiments described herein can be employed relative to distributed computing environments (e.g., cloud computing environments), such as described below with respect to FIG. 16, where certain tasks are performed by remote processing devices that are linked through a communications network. In a distributed computing environment, program modules can be located both in local and/or remote memory storage devices.

For example, one or more embodiments described herein and/or one or more components thereof can employ one or more computing resources of the cloud computing environment 1650 described below with reference to the system 1600 of FIG. 16, and/or with reference to the one or more functional abstraction layers (e.g., quantum software and/or the like) described below with reference to FIG. 17, to execute one or more operations in accordance with one or more embodiments described herein. For example, cloud computing environment 1650 and/or one or more of the functional abstraction layers 1760, 1770, 1780 and/or 1790 can comprise one or more classical computing devices (e.g., classical computer, classical processor, virtual machine, server and/or the like), quantum hardware and/or quantum software (e.g., quantum computing device, quantum computer, quantum processor, quantum circuit simulation software, superconducting circuit and/or the like) that can be employed by one or more embodiments described herein and/or components thereof to execute one or more operations in accordance with one or more embodiments described herein. For instance, one or more embodiments described herein and/or components thereof can employ such one or more classical and/or quantum computing resources to execute one or more classical and/or quantum: mathematical function, calculation and/or equation; computing and/or processing script; algorithm; model (e.g., artificial intelligence (AI) model, machine learning (ML) model and/or like model); and/or other operation in accordance with one or more embodiments described herein.

It is to be understood that although one or more embodiments described herein include a detailed description on cloud computing, implementation of the teachings recited herein are not limited to a cloud computing environment. Rather, one or more embodiments described herein are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines and/or services) that can be rapidly provisioned and released with minimal management effort or interaction with a provider of the service. This cloud model can include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but can specify location at a higher level of abstraction (e.g., country, state and/or datacenter).

Rapid elasticity: capabilities can be rapidly and elastically provisioned, in one or more cases automatically, to quickly scale out and rapidly released to quickly scale in. To the consumer, the capabilities available for provisioning can appear to be unlimited and can be purchased in any quantity at any time.

Measured service: cloud systems automatically control and optimize resource use by leveraging a metering capability at one or more levels of abstraction appropriate to the type of service (e.g., storage, processing, bandwidth and/or active user accounts). Resource usage can be monitored, controlled and/or reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage and/or individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems and/or storage, but has control over the deployed applications and possibly application hosting environment configurations.

Infrastructure as a Service (IaaS): the capability provided to the consumer is to provision processing, storage, networks and/or other fundamental computing resources where the consumer can deploy and run arbitrary software, which can include operating systems and applications. The consumer does not manage or control the underlying cloud infrastructure but has control over operating systems, storage, deployed applications and/or possibly limited control of select networking components (e.g., host firewalls).

Deployment Models are as follows:

Individual cloud: the cloud infrastructure is operated solely for an organization. It can be managed by the organization or a third party and can exist on-premises or off-premises.

Community cloud: the cloud infrastructure is shared by several organizations and supports a specific community that has shared concerns (e.g., mission, security requirements, policy and/or compliance considerations). It can be managed by the organizations or a third party and can exist on-premises or off-premises.

Public cloud: the cloud infrastructure is made available to the general public or a large industry group and is owned by an organization selling cloud services.

Hybrid cloud: the cloud infrastructure is a composition of two or more clouds (individual, community or public) that remain unique entities but are bound together by standardized or proprietary technology that enables data and application portability (e.g., cloud bursting for load-balancing among clouds).

A cloud computing environment is service oriented with a focus on statelessness, low coupling, modularity and/or semantic interoperability. At the heart of cloud computing is an infrastructure that includes a network of interconnected nodes.

Moreover, the non-limiting system 100 and/or the example operating environment 1500 can be associated with and/or be included in a data analytics system, a data processing system, a graph analytics system, a graph processing system, a big data system, a social network system, a speech recognition system, an image recognition system, a graphical modeling system, a bioinformatics system, a data compression system, an artificial intelligence system, an authentication system, a syntactic pattern recognition system, a medical system, a health monitoring system, a network system, a computer network system, a communication system, a router system, a server system, a high availability server system (e.g., a Telecom server system), a Web server system, a file server system, a data server system, a disk array system, a powered insertion board system, a cloud-based system and/or the like. In accordance therewith, non-limiting system 100 and/or example operating environment 1500 can be employed to use hardware and/or software to solve problems that are highly technical in nature, that are not abstract and/or that cannot be performed as a set of mental acts by a human.

Referring now to details of one or more aspects illustrated at FIG. 16, the illustrative cloud computing environment 1650 is depicted. As shown, cloud computing environment 1650 includes one or more cloud computing nodes 1610 with which local computing devices used by cloud consumers, such as, for example, cellular telephone 1654A, desktop computer 1654B, laptop computer 1654C and/or automobile computer system 1654N can communicate. Although not illustrated in FIG. 16, cloud computing nodes 1610 can further comprise a quantum platform (e.g., quantum computer, quantum hardware, quantum software and/or the like) with which local computing devices used by cloud consumers can communicate. Cloud computing nodes 1610 can communicate with one another. They can be grouped (not shown) physically or virtually, in one or more networks, such as Individual, Community, Public, or Hybrid clouds as described hereinabove, or a combination thereof. This allows cloud computing environment 1650 to offer infrastructure, platforms and/or software as services for which a cloud consumer does not need to maintain resources on a local computing device. It is understood that the types of computing devices 1654A-N shown in FIG. 16 are intended to be illustrative only and that cloud computing nodes 1610 and cloud computing environment 1650 can communicate with any type of computerized device over any type of network and/or network addressable connection (e.g., using a web browser).

Referring now to details of one or more aspects illustrated at FIG. 17, a set 1700 of functional abstraction layers is shown, such as provided by cloud computing environment 1650 (FIG. 16). One or more embodiments described herein can be associated with, such as accessible via, one or more functional abstraction layers described below with reference to FIG. 17 (e.g., hardware and software layer 1760, virtualization layer 1770, management layer 1780 and/or workloads layer 1790). It should be understood in advance that the components, layers and/or functions shown in FIG. 17 are intended to be illustrative only and embodiments described herein are not limited thereto. As depicted, the following layers and/or corresponding functions are provided:

Hardware and software layer 1760 can include hardware and software components. Examples of hardware components include: mainframes 1761; RISC (Reduced Instruction Set Computer) architecture-based servers 1762; servers 1763; blade servers 1764; storage devices 1765; and/or networks and/or networking components 1766. In one or more embodiments, software components can include network application server software 1767, quantum platform routing software 1768; and/or quantum software (not illustrated in FIG. 17).

Virtualization layer 1770 can provide an abstraction layer from which the following examples of virtual entities can be provided: virtual servers 1771; virtual storage 1772; virtual networks 1773; virtual applications and/or operating systems 1774; and/or virtual clients 1775.

In one example, management layer 1780 can provide the functions described below. Resource provisioning 1781 can provide dynamic procurement of computing resources and other resources that can be utilized to perform tasks within the cloud computing environment. Metering and Pricing 1782 can provide cost tracking as resources are utilized within the cloud computing environment, and/or billing and/or invoicing for consumption of these resources. In one example, these resources can include one or more application software licenses. Security can provide identity verification for cloud consumers and/or tasks, as well as protection for data and/or other resources. User (or entity) portal 1783 can provide access to the cloud computing environment for consumers and system administrators. Service level management 1784 can provide cloud computing resource allocation and/or management such that required service levels are met. Service Level Agreement (SLA) planning and fulfillment 1785 can provide pre-arrangement for, and procurement of, cloud computing resources for which a future requirement is anticipated in accordance with an SLA.

Workloads layer 1790 can provide examples of functionality for which the cloud computing environment can be utilized. Non-limiting examples of workloads and functions which can be provided from this layer include: mapping and navigation 1791; software development and lifecycle management 1792; virtual classroom education delivery 1793; data analytics processing 1794; transaction processing 1795; and/or application transformation software 1796.

One or more embodiments can be a system, a method, an apparatus and/or a computer program product at any possible technical detail level of integration. The computer program product can include a computer readable storage medium (or media) having computer readable program instructions thereon for causing a processor to carry out aspects of the one or more embodiments. The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium can include the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device. Computer readable program instructions for carrying out operations of the disclosed subject matter can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the disclosed subject matter.

Aspects of disclosed subject matter are described herein with reference to flowchart illustrations and/or block diagrams of methods, apparatus (systems), and computer program products according to embodiments of the subject disclosure. It will be understood that each block of the flowchart illustrations and/or block diagrams, and combinations of blocks in the flowchart illustrations and/or block diagrams, can be implemented by computer readable program instructions. These computer readable program instructions can be provided to a processor of a general purpose computer, special purpose computer, or other programmable data processing apparatus to produce a machine, such that the instructions, which execute via the processor of the computer or other programmable data processing apparatus, create method for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks. The computer readable program instructions can also be loaded onto a computer, other programmable data processing apparatus, or other device to cause a series of operational acts to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the disclosed subject matter. In this regard, each block in the flowchart or block diagrams can represent a module, segment, or portion of instructions, which comprises one or more executable instructions for implementing the specified logical function(s). In some alternative implementations, the functions noted in the blocks can occur out of the order noted in the Figures. For example, two blocks shown in succession can be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the subject matter has been described above in the general context of computer-executable instructions of a computer program product that runs on a computer and/or computers, those skilled in the art will recognize that this disclosure also can be implemented in combination with other program modules. Generally, program modules include routines, programs, components, data structures, etc. that perform particular tasks and/or implement particular abstract data types. Moreover, those skilled in the art will appreciate that the computer-implemented methods disclosed herein can be practiced with other computer system configurations, including single-processor or multiprocessor computer systems, mini-computing devices, mainframe computers, as well as computers, hand-held computing devices (e.g., PDA, phone), microprocessor-based or programmable consumer or industrial electronics, and the like. The illustrated aspects can also be practiced in distributed computing environments where tasks are performed by remote processing devices that are linked through a communications network. However, some, if not all aspects of this disclosure can be practiced on stand-alone computers. In a distributed computing environment, program modules can be located in local and remote memory storage devices.

As used in this application, the terms "component," "system," "platform," "interface," and the like, can refer to and/or can include a computer-related entity or an entity related to an operational machine with one or more specific functionalities. The entities disclosed herein can be either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution and a component can be localized on one computer and/or distributed between two or more computers. In another example, respective components can execute from various computer readable media having various data structures stored thereon. The components can communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As yet another example, a component can be an apparatus that provides specific functionality through electronic components without mechanical parts, wherein the electronic components can include a processor or other method to execute software or firmware that confers at least in part the functionality of the electronic components. In an aspect, a component can emulate an electronic component via a virtual machine, e.g., within a cloud computing system.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form. As used herein, the terms "example" and/or "exemplary" are utilized to mean serving as an example, instance, or illustration. For the avoidance of doubt, the subject matter disclosed herein is not limited by such examples. In addition, any aspect or design described herein as an "example" and/or "exemplary" is not necessarily to be construed as preferred or advantageous over other aspects or designs, nor is it meant to preclude equivalent exemplary structures and techniques known to those of ordinary skill in the art.

As it is employed in the subject specification, the term "processor" can refer to substantially any computing processing unit or device comprising, but not limited to, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Further, processors can exploit nano-scale architectures such as, but not limited to, molecular and quantum-dot based transistors, switches and gates, in order to optimize space usage or enhance performance of user equipment. A processor can also be implemented as a combination of computing processing units. In this disclosure, terms such as "store," "storage," "data store," data storage," "database," and substantially any other information storage component relevant to operation and functionality of a component are utilized to refer to "memory components," entities embodied in a "memory," or components comprising a memory. It is to be appreciated that memory and/or memory components described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), flash memory, or nonvolatile random access memory (RAM) (e.g., ferroelectric RAM (FeRAM)). Volatile memory can include RAM, which can act as external cache memory, for example. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM (RDRAM). Additionally, the disclosed memory components of systems or computer-implemented methods herein are intended to include, without being limited to including, these and any other suitable types of memory.

What has been described above include mere examples of systems and computer-implemented methods. It is, of course, not possible to describe every conceivable combination of components or computer-implemented methods for purposes of describing this disclosure, but one of ordinary skill in the art can recognize that many further combinations and permutations of this disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim. The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system, comprising:
a memory that stores computer-executable components; and
a processor, operatively coupled to the memory, that executes the computer-executable components, the computer-executable components comprising:
a monitoring job component that executes a group of monitoring jobs on a quantum computer based on a group of data that is input to the quantum computer; and
a calibration agent that determines a calibration strategy relating to an ordering of performance of a group of calibration tasks to calibrate at least one parameter associated with the quantum computer based on input from the group of monitoring jobs, wherein the calibration agent executes a group of calibrations on a group of quantum computers, comprising the quantum computer, at a group of time instances based on the calibration strategy, and wherein the calibration strategy reduces an amount of downtime of the group of quantum computers to perform the group of calibrations on the group of quantum computers.

2. The system of claim 1, wherein the input from the group of monitoring jobs comprises a group of parameter values comprises respective parameter values of respective parameters at respective time instances, and wherein the computer-executable components further comprise:
a modeler component that determines respective quantum computer system state parameter values associated with the quantum computer at a given time instance based on the group of parameter values determined from output data generated by the quantum computer in response to the execution of the group of monitoring jobs, wherein a group of quantum computer system state parameter values models respective states of the quantum computer associated with the respective parameters, and wherein the group of quantum computer system state parameter values comprises the respective quantum computer system state parameter values.

3. The system of claim 2, wherein the calibration agent determines the calibration strategy for the calibration of the quantum computer, comprising determining a group of items to calibrate, determining respective orderings of performance of calibration tasks to calibrate respective items of the group of items, or determining scheduling of the calibration of the group of items associated with the quantum computer, based on the group of quantum computer system state parameter values, wherein the group of items comprises a qubit or a pair of qubits of the quantum computer or a portion of the respective parameters associated with the quantum computer, and wherein the portion of the respective parameters comprises the at least one parameter.

4. The system of claim 2, wherein the modeler component determines the group of quantum computer system state parameter values based on a statistical process control analysis performed on the group of parameter values, wherein the group of parameter values comprises one or more of the respective parameter values, wherein, as part of the statistical process control analysis, the modeler component determines whether the one or more respective parameter values satisfy an anomaly detection rule, and wherein satisfaction of the anomaly detection rule indicates an anomaly exists with regard to the one or more respective parameter values.

5. The system of claim 2, wherein the modeler component determines the group of quantum computer system state parameter values based on a stochastic process modeling analysis performed on the group of parameter values, wherein the group of parameter values comprises one or more of the respective parameter values, wherein, as part of the stochastic process modeling analysis, the modeler component determines whether the one or more respective parameter values satisfy a condition relating to a parameter value change in relation to a baseline parameter value, and wherein satisfaction of the condition indicates that a defined threshold amount of parameter value change has occurred with regard to the one or more respective parameter values in relation to the baseline parameter value.

6. The system of claim 2, wherein the group of quantum computer system state parameter values indicates whether the respective parameter values have changed beyond respective defined threshold amounts of parameter value change applicable to the respective parameters.

7. The system of claim 6, wherein the calibration agent determines the calibration strategy relating to the ordering of the performance of the group of calibration tasks to calibrate the at least one parameter associated with the quantum computer based on a result of determining whether the respective parameter values have changed beyond the respective defined threshold amounts of parameter value change.

8. The system of claim 1, wherein the calibration agent determines a performance reward value that corresponds to a performance reward in performing the calibration of the at least one parameter at a time instance or a time frequency, and wherein the performance reward relates to a first benefit gained from performing the calibration at the time instance or the time frequency.

9. The system of claim 8, wherein the calibration agent determines an availability reward value that corresponds to an availability reward in performing the calibration of the at least one parameter at the time instance or the time frequency, wherein the availability reward relates to a second benefit gained from availability of the quantum computer resulting from the quantum computer not being unavailable for one or more time periods for performance of one or more calibrations of one or more parameters associated with the quantum computer,
wherein the calibration agent determines a reward value as a function of the performance reward value and the availability reward value, and wherein the reward value corresponds to an overall benefit in performing the calibration of the at least one parameter at the time instance or the time frequency.

10. The system of claim 9, wherein the calibration agent updates a calibration policy relating to calibration of a group of quantum computers, comprising the quantum computer, based on the calibration strategy or the reward value, and wherein the calibration agent generates an updated calibration policy based on updating of the calibration policy.

11. The system of claim 10, wherein the group of data is a first group of data, wherein the group of monitoring jobs is a first group of monitoring jobs,
wherein the calibration agent determines a second group of monitoring jobs, and determines a second group of data to input to the quantum computer to facilitate execution of the second group of monitoring jobs on the quantum computer, based on the updated calibration policy, and
wherein the monitoring job component executes the second group of monitoring jobs on the quantum computer based on the second group of data input to the quantum computer, in accordance with the updated calibration policy.

12. The system of claim 9, wherein the calibration agent, using an artificial intelligence model, performs an analysis on at least one of parameter values associated with the quantum computer or quantum computer system state parameter values associated with the quantum computer that are input to the artificial intelligence model, wherein, based on a result of the analysis, the calibration agent determines the calibration strategy, the reward value, or an update to a calibration policy relating to calibration of a group of quantum computers, comprising the quantum computer, and wherein the calibration agent is trained based on the reward value or the result of the analysis.

13. A computer-implemented method, comprising:
executing, by a system operatively coupled to a processor, a group of monitoring jobs on a quantum computer based on a group of data that is input to the quantum computer;
determining, by the system, a calibration strategy relating to an ordering of performance of a group of calibration tasks to calibrate at least one parameter associated with the quantum computer based on input information determined from the group of monitoring jobs; and
executing, by the system, a group of calibrations on a group of quantum computers, comprising the quantum computer, at a group of time instances based on the calibration strategy, wherein the calibration strategy reduces an amount of downtime of the group of quantum computers associated with the group of calibrations of the group of quantum computers.

14. The computer-implemented method of claim 13, wherein the input information comprises a group of parameter values that comprises respective parameter values of respective parameters at respective time instances, and wherein the method further comprises:
determining, by the system, respective quantum computer system state parameter values associated with the quantum computer at a particular time instance based on the group of parameter values; and
determining, by the system, the calibration strategy for the calibration of the quantum computer, comprising determining a group of items to calibrate, determining respective orderings of performance of calibration tasks to calibrate respective items of the group of items, or determining scheduling of the calibration of the group of items based on the group of quantum computer system state parameter values, wherein the group of items comprises a qubit or a pair of qubits of the quantum computer or a portion of the respective parameters associated with the quantum computer, and wherein the portion of the respective parameters comprises the at least one parameter.

15. The computer-implemented method of claim 13, wherein the input information comprises a group of parameter values associated with the quantum computer, and wherein the method further comprises:
determining, by the system, a reward value that corresponds to a reward in performing the calibration at a time instance or a time frequency;
updating, by the system, a calibration policy relating to calibration of a group of quantum computers, comprising the quantum computer, based on the calibration strategy or the reward value; and
generating, by the system, an updated calibration policy based on the updating of the calibration policy.

16. The computer-implemented method of claim 15, further comprising:
determining, by the system, the calibration strategy or the updating of the calibration policy based on at least one of a first result of analyzing a group of information items based on an artificial intelligence model, a second result of analyzing the group of information items retrieved from a look-up table, or a third result of analyzing the group of information items associated with a decision tree,
wherein the group of information items comprises or relates to the group of parameter values associated with the quantum computer, a group of quantum computer system state parameter values associated with the quantum computer, or feedback information relating to the calibration of the quantum computer, and wherein the feedback information is received from a user.

17. A computer program product that facilitates calibration of a quantum computer, the computer program product comprising a computer readable storage medium having program instructions embodied therewith, the program instructions are executable by a processor to cause the processor to:

perform a group of monitoring jobs on the quantum computer based on a group of data that is applied to the quantum computer; and determine a calibration strategy relating to an ordering of performance of a group of calibration tasks to calibrate at least one parameter associated with the quantum computer based on input information derived from the performing of the group of monitoring jobs, wherein the input information comprises a group of parameter values that comprises respective parameter values of respective parameters at respective time instances, and wherein the program instructions are executable by the processor to cause the processor to:

perform a group of calibrations on a group of quantum computers, comprising the quantum computer, at a group of time instances based on the calibration strategy, wherein the determination of the calibration strategy comprises at least one of determination of a group of items to calibrate, determination of respective orderings of performance of calibration tasks to calibrate respective items of the group of items, or determination of scheduling of the calibration of the group of items, wherein the group of items comprises a qubit of the quantum computer or a portion of the respective parameters associated with the quantum computer, wherein the portion of the respective parameters comprises the at least one parameter, and wherein the calibration strategy mitigates an amount of downtime of the group of quantum computers for the group of calibrations of the group of quantum computers.

* * * * *